(12) United States Patent
Sheldon et al.

(10) Patent No.: US 11,709,150 B2
(45) Date of Patent: Jul. 25, 2023

(54) APPARATUS AND METHOD FOR INSPECTION OF A MATERIAL

(71) Applicant: BWXT NUCLEAR OPERATIONS GROUP, INC., Lynchburg, VA (US)

(72) Inventors: Paul D. Sheldon, Lynchburg, VA (US); Wayne M. Latham, Forest, VA (US); Thomas C. Mohr, Forest, VA (US); Aaron C. Havener, Pittsburgh, PA (US); Richard Manzini, Pittsburgh, PA (US); Timothy A. Policke, Forest, VA (US)

(73) Assignee: BWXT Nuclear Operations Group, Inc., Lynchburg, VA (US)

( * ) Notice: Subject to any disclaimer, the term of this patent is extended or adjusted under 35 U.S.C. 154(b) by 0 days.

(21) Appl. No.: 17/561,647

(22) Filed: Dec. 23, 2021

(65) Prior Publication Data

US 2022/0268735 A1 Aug. 25, 2022

Related U.S. Application Data

(60) Provisional application No. 63/153,093, filed on Feb. 24, 2021.

(51) Int. Cl.
*G01N 27/90* (2021.01)
*G01N 23/223* (2006.01)

(52) U.S. Cl.
CPC ....... *G01N 27/9046* (2013.01); *G01N 23/223* (2013.01); *G01N 27/9073* (2013.01); *G01N 2223/076* (2013.01)

(58) Field of Classification Search
CPC ........... G01N 2223/076; G01N 23/223; G01N 27/902; G01N 27/9046; G01N 27/9073
See application file for complete search history.

(56) References Cited

U.S. PATENT DOCUMENTS

| | | |
|---|---|---|
| 4,429,409 A | 1/1984 | Berry et al. |
| 4,686,694 A | 8/1987 | Berry et al. |
| 4,893,020 A | 1/1990 | Ono |
| 5,506,503 A | 4/1996 | Cecco et al. |
| 6,272,203 B1 | 8/2001 | Yoneda et al. |
| 7,416,462 B2 | 8/2008 | Noma et al. |
| 7,536,266 B2 | 5/2009 | Butler et al. |
| 7,796,726 B1 | 9/2010 | Gendreau et al. |
| 7,916,834 B2 | 3/2011 | Piorek et al. |
| 8,130,902 B2 | 3/2012 | Adams et al. |
| 9,070,530 B2 | 6/2015 | Sipila |
| 10,509,000 B2 | 12/2019 | He et al. |
| 2003/0161431 A1 | 8/2003 | Akers |
| 2007/0229066 A1 | 10/2007 | Narishige et al. |

(Continued)

OTHER PUBLICATIONS

International Search Report and Written Opinion, PCT/US2021/065118, dated Mar. 10, 2022, 9 pages.

*Primary Examiner* — Alvaro E Fortich
*Assistant Examiner* — Adam S Clarke
(74) *Attorney, Agent, or Firm* — Nelson Mullins Riley Scarborough LLP

(57) ABSTRACT

A method of inspecting a material includes examining a surface of a test material with an eddy current sensor and applying an X-ray fluorescence analysis to the surface of the test material at the same location at which the eddy current examination was performed.

17 Claims, 8 Drawing Sheets

(56) References Cited

U.S. PATENT DOCUMENTS

| | | | |
|---|---|---|---|
| 2009/0039877 A1* | 2/2009 | Tralshawala | G01R 33/10 324/222 |
| 2010/0327858 A1 | 12/2010 | Simek et al. | |
| 2011/0222654 A1* | 9/2011 | Sommer | G01N 23/223 378/45 |
| 2015/0308981 A1 | 10/2015 | Fisher | |
| 2022/0221428 A1* | 7/2022 | Shumka | G01N 27/9006 |

* cited by examiner

APPARATUS AND METHOD FOR INSPECTION OF A MATERIAL

CLAIM OF PRIORITY

This application claims priority to U.S. provisional patent application No. 63/153,093 filed Feb. 24, 2021, the disclosure of which is incorporated by reference herein.

STATEMENT REGARDING FEDERALLY SPONSORED RESEARCH OR DEVELOPMENT

This invention was made with support under contracts awarded by the Federal Government. The United States Government has certain rights in this invention.

TECHNICAL FIELD

Example embodiments generally relate to material inspection and, in particular, non-destructive testing.

BACKGROUND

Standard industry practice for testing material acceptability of composite components composed of corrosion resistant materials (including alloys) such as zirconium, and/or welds, is to assess the quality of an oxide film grown on the metal by any of various methods. Such techniques have also been used in the development of new alloys, in heat treating practices, and for evaluation of welding techniques. A film's acceptability can be assessed by the gain in the specimen's mass attributable to the film or by the oxide film's appearance to an operator, for example, subject to ASTM Standard G2/G2M—06 (2011). Non-corrosion resistant materials, which can have predictable corrosion characteristics corresponding to respective known contaminants, may also be inspected visually to identify a given contaminant based on the appearance of corrosion on the material at a contaminated area. Conformance with appearance criteria is judged by comparison to a standard—a technique whose effectiveness depends upon inspector training, skill, and experience, and the control of the inspection area environment. The effectiveness of visual inspection is also limited by the restrictions to human perception. Ideally, for example, a weld includes no contaminating alloys, and in that event, the weld's surface should have a predictable appearance because corrosion forms on the surface at a predictable rate. Contaminant alloys present in the weld material, however, may corrode at a rate different from that of the surrounding material, thereby causing a difference in the appearance of, for example, an oxide film formed on the material surface at the location at which the contaminant occurs. Visual inspection may also be used to verify proper mixing of different joined materials or different joined and fill materials, again because a corrosion layer may form on the material in a predictable manner. Depending on the contaminant and the substrate material, however, such aberrations may not be visible to the human eye.

Other methods are known for inspecting materials, for example, when visual inspection is unavailable because the characteristics of interest in the material are not detectable by the human eye. An X-ray fluorescence (XRF) spectrometer, for example, may be used to direct an ionizing radiation to an area of interest of the test material. It should be understood that, as used herein, the term "X-ray" may encompass photons having energies in the range of about 100 eV to about 200 keV, and, for example, about 1 keV to about 150 keV, and may encompass Rayleigh radiation, Compton radiation and Gamma rays. Photons in the radiation energize electrons within the material in low atomic orbits, causing the electrons to dislodge and leaving holes in the low orbit that are immediately filled by higher-orbit electrons. The descent of the higher-energy, higher-orbit electrons into the lower-energy, lower-orbit holes releases energy at wavelengths and energy levels specific to the materials to which the X-ray energy is directed. This fluorescence energy is, then, detected by the X-ray device. Depending upon whether the spectrometer operates upon wavelength-dispersive or energy-dispersive principles, the spectrometer analyzes the returning fluorescence energy and, based upon its wavelength or energy level, determines the material that generated the fluorescence and that is, therefore, present in the test material. As should be understood, XRF spectrometers can provide detailed information about materials present in the test material, including composition, e.g., weight percentage for major and minor constituents. XRF spectrometers may calculate relative concentration of trace elements based upon the amount of fluorescent energy that occurs at predetermined levels. Moreover, where the device is calibrated against test materials having known compositions, these predetermined energy or wavelength levels may be associated in memory with the identities of the materials to which they correspond, thereby allowing the spectrometer to also display the name of an element in the test material that generated the fluorescent energy. Due to its low cost per sample, lack of sample preparation requirements (XRF may be used with a material regardless whether the material has an oxide layer), and ease of use, XRF is one of the most widely used methods for analyzing major and trace elements in both industrial and laboratory settings.

Furthermore, it is also known to utilize eddy current test devices to inspect materials for cracks, undesirable material variations, voids, oxide layer thickness variations, and other flaws. In general, an eddy current test device includes one or an array of coils, which may be formed by wire windings or by semiconductor traces, that the device drives with a time-varying alternating current (AC) signal. Each coil, when activated, creates an alternating magnetic field that couples with an area of an electrically conductive material under test directly opposite the coil, thereby producing eddy currents in the test material that flow in the same direction as current through the primary windings of the test device. The induced eddy currents create their own magnetic field, which in turn couple to the primary winding to thereby induce electric current in the primary winding opposite to the winding's driving current and raising the winding's impedance. Thus, the test material's presence proximate the primary winding changes the primary winding's impedance from what it would be in the test material's absence. The degree of that change depends on the test material's electrical conductivity and magnetic permeability, in a manner that is known where the test material has no defects. Thus, the eddy current sensor's output signal varies with variation in the test material's electrical conductivity and magnetic permeability. Because these characteristics vary with variations in the test material's material and structural composition, the test device may be calibrated against test materials having benchmark material and structural compositions and test materials having known variations therefrom (e.g. the inclusion of contaminant materials, the occurrence of cracks and porosity that typically appear as air gaps, and variations in oxide layer thickness on a conductive material), so that variations in the measured impedance of the primary winding as the primary winding is later moved over a material under test can be associated with the previously calibrated material and structural variations.

BRIEF SUMMARY OF SOME EXAMPLES

Some example embodiments may include a method of inspecting a material including disposing an eddy current sensor proximate a material so that, when activated, the eddy current sensor outputs a measurement signal that varies with variations in electrical conductivity and magnetic permeability of the material. The eddy current sensor is activated, and a resulting measurement signal is acquired from the activated eddy current sensor when the activated eddy current sensor is proximate a surface of the material at a location on the surface. Data corresponding to the measurement signal is compared to a first predetermined criteria corresponding to presence of a first predetermined condition of the material. An X-ray signal is applied to the material at the location. A fluorescence signal resulting from application of the X-ray signal at the location is acquired. The fluorescence signal is compared to a second predetermined criteria corresponding to presence of a second predetermined condition of the material.

In another embodiment, a method of inspecting a material includes disposing an eddy current sensor proximate a material so that, when activated, the eddy current sensor outputs a measurement signal that varies with variations in electrical conductivity and magnetic permeability of the material. The eddy current sensor is moved over a surface of the material while activated. The measurement signals are repeatedly acquired from the activated eddy current sensor, each acquired measurement signal being acquired when the activated eddy current sensor is proximate the surface of the material at a respective location of a plurality of locations on the surface. For each measurement signal acquired at the acquiring step, data corresponding to the acquired measurement signal is compared to a respective first predetermined criteria corresponding to presence of a first predetermined condition of the material at the respective location at which the measurement signal was acquired. An X-ray signal is applied to the material at at least one location of the plurality of locations. A respective fluorescence signal resulting from application of the X-ray signal at the at least one location is acquired. Data corresponding to each respective fluorescence signal is compared to a respective second predetermined criteria corresponding to presence of a second predetermined condition of the material.

In a further embodiment, a method of inspecting a material includes disposing an eddy current sensor proximate a material so that, when activated, the eddy current sensor outputs a measurement signal that varies with variations in electrical conductivity and magnetic permeability of the material. The eddy current sensor is moved over a surface of the material while the eddy current sensor is activated. The measurement signal is acquired from the activated eddy current sensor when the activated eddy current sensor is proximate a surface of the material at a location on the surface. Data corresponding to the measurement signal is compared to a first predetermined criteria corresponding to presence of a predetermined condition of the material. In response to a comparison resulting from the comparing step, an X-ray fluorescence spectrometer is disposed proximate the location so that activation of the X-ray fluorescence spectrometer causes the X-ray fluorescence spectrometer to apply an X-ray signal to the metal at the location and acquire a fluorescence signal resulting from the application of the X-ray signal at the location.

BRIEF DESCRIPTION OF THE SEVERAL VIEWS OF THE DRAWING(S)

Having thus described one or more embodiments of a material inspection system in general terms, reference will now be made to the accompanying drawings, which are not necessarily drawn to scale, and wherein:

Figure 2:
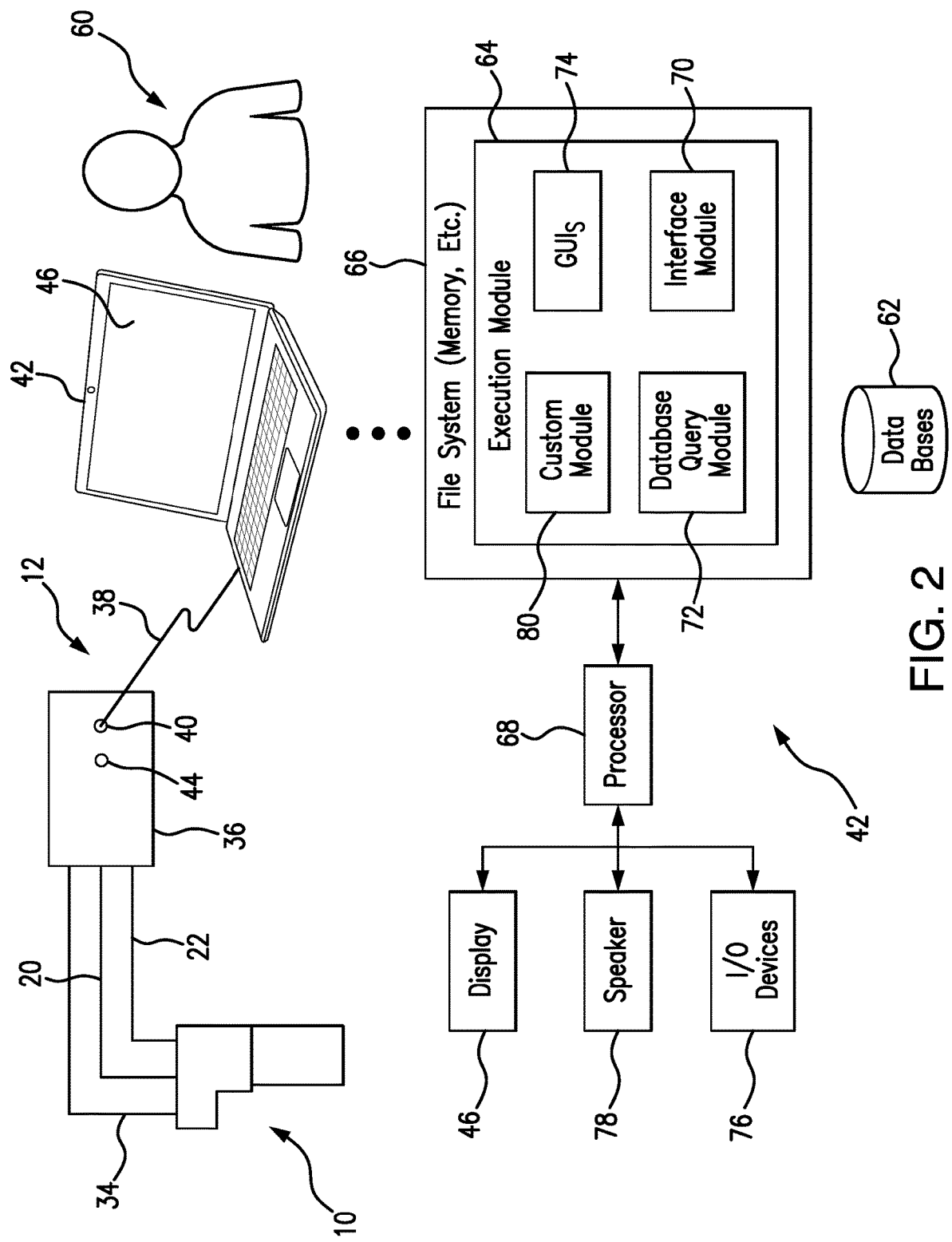
FIG. 2 is a schematic illustration of an eddy current measurement system for use in a system and/or method for inspection of a material as provided herein.
Figure 3:
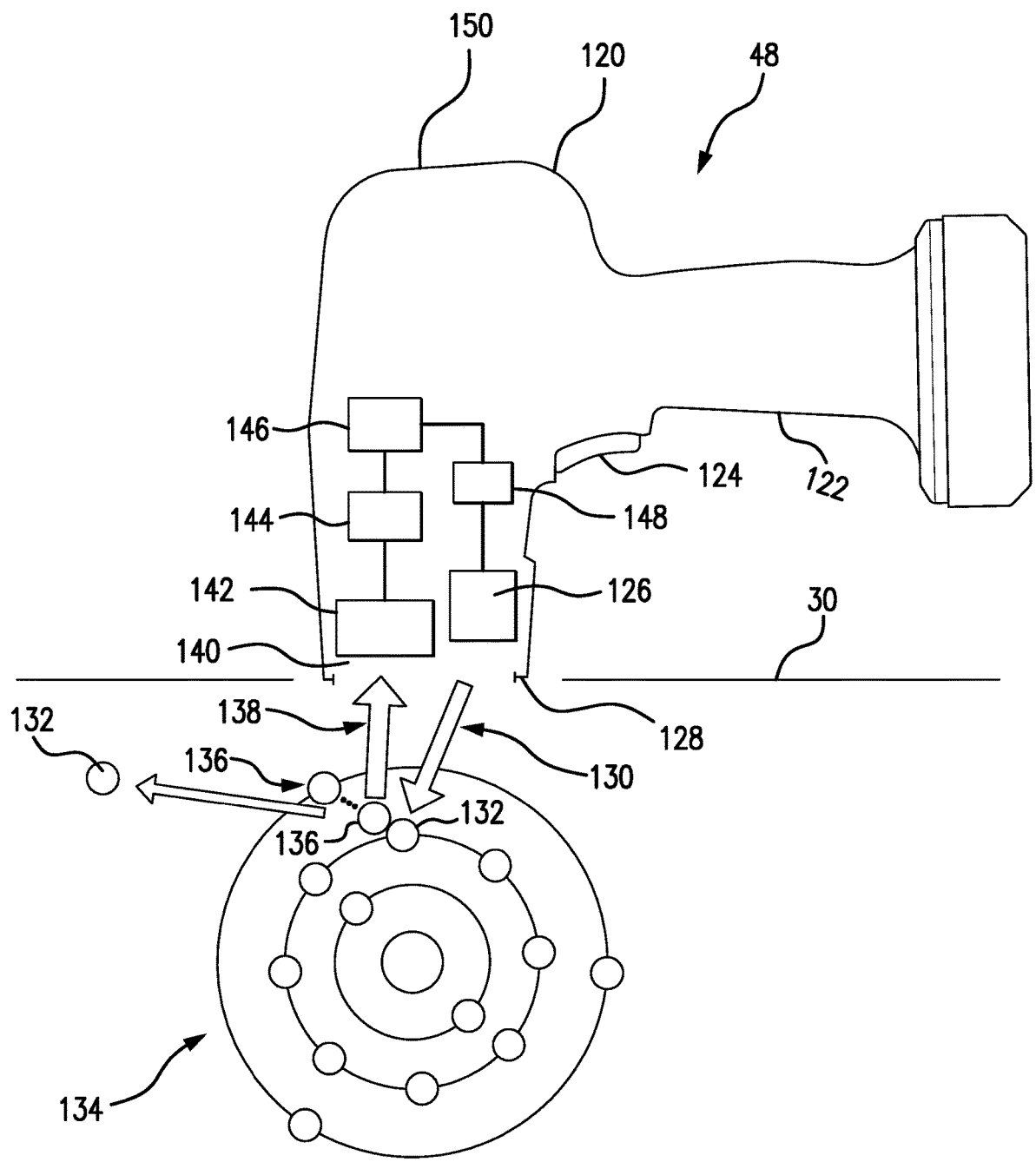
FIG. 3 is a schematic illustration of an X-ray fluorescence measurement system for use in a system and/or method for inspection of a material as provided herein.
Figure 4A:
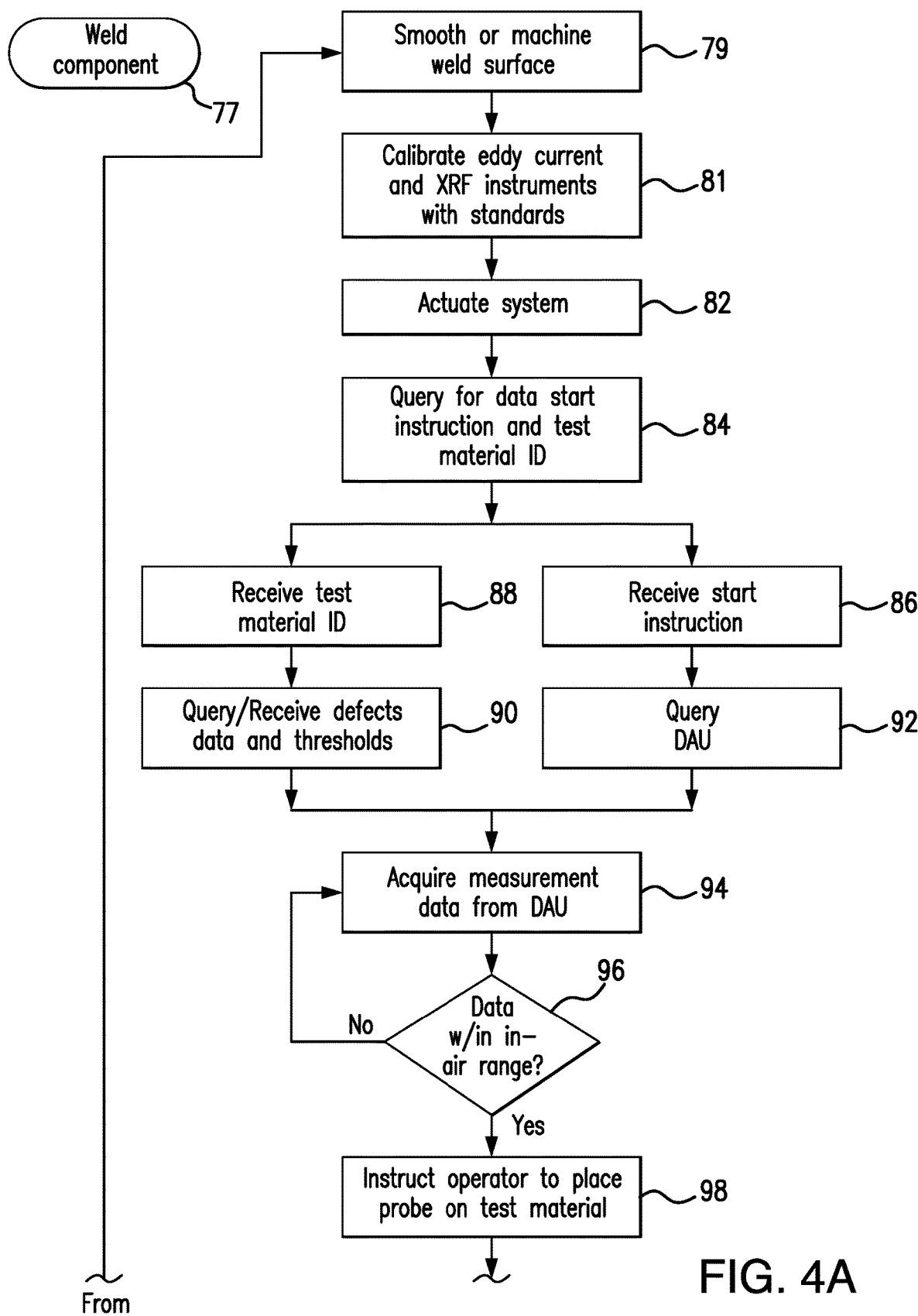
Figure 4B:
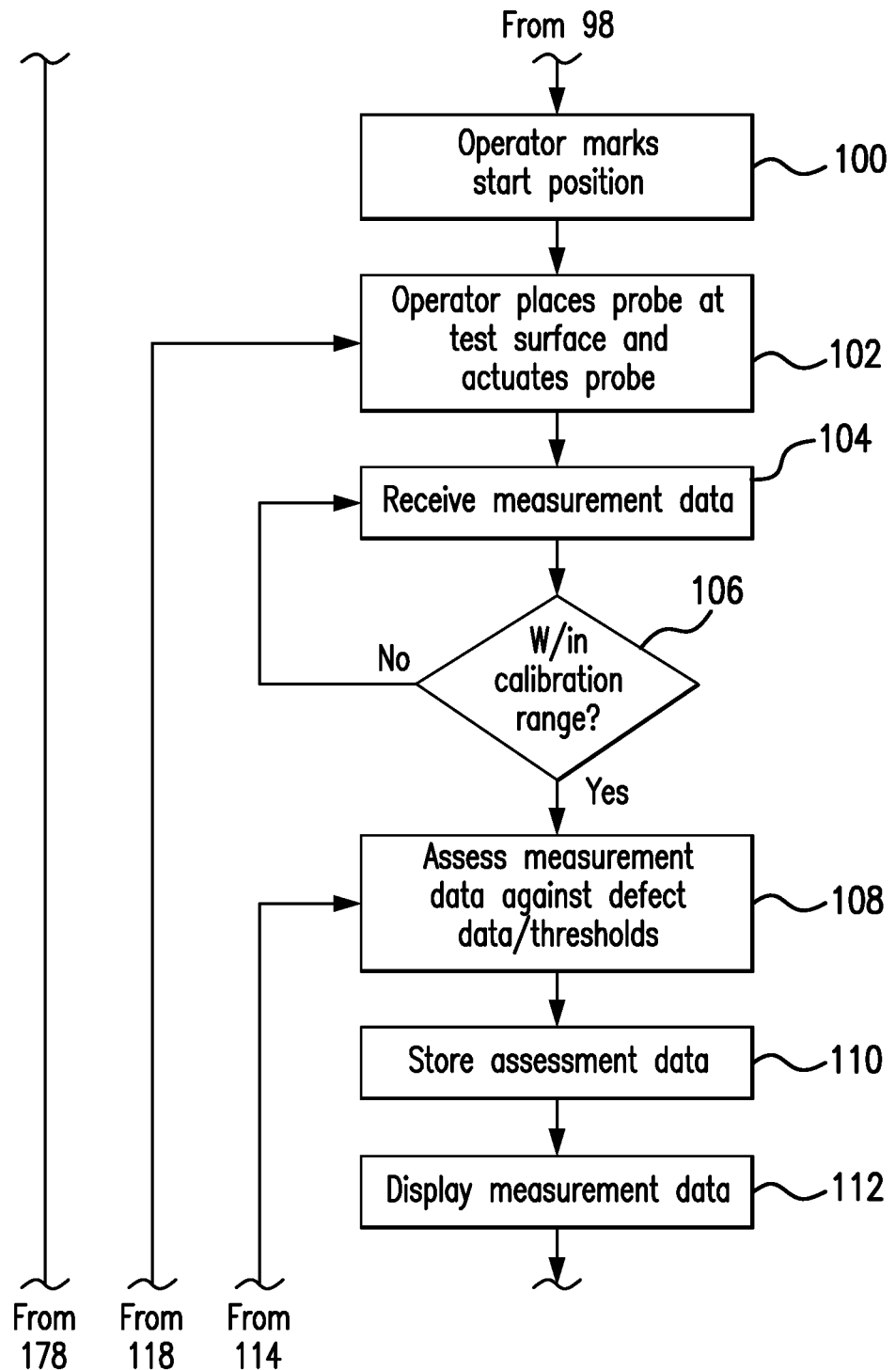
Figure 4C:
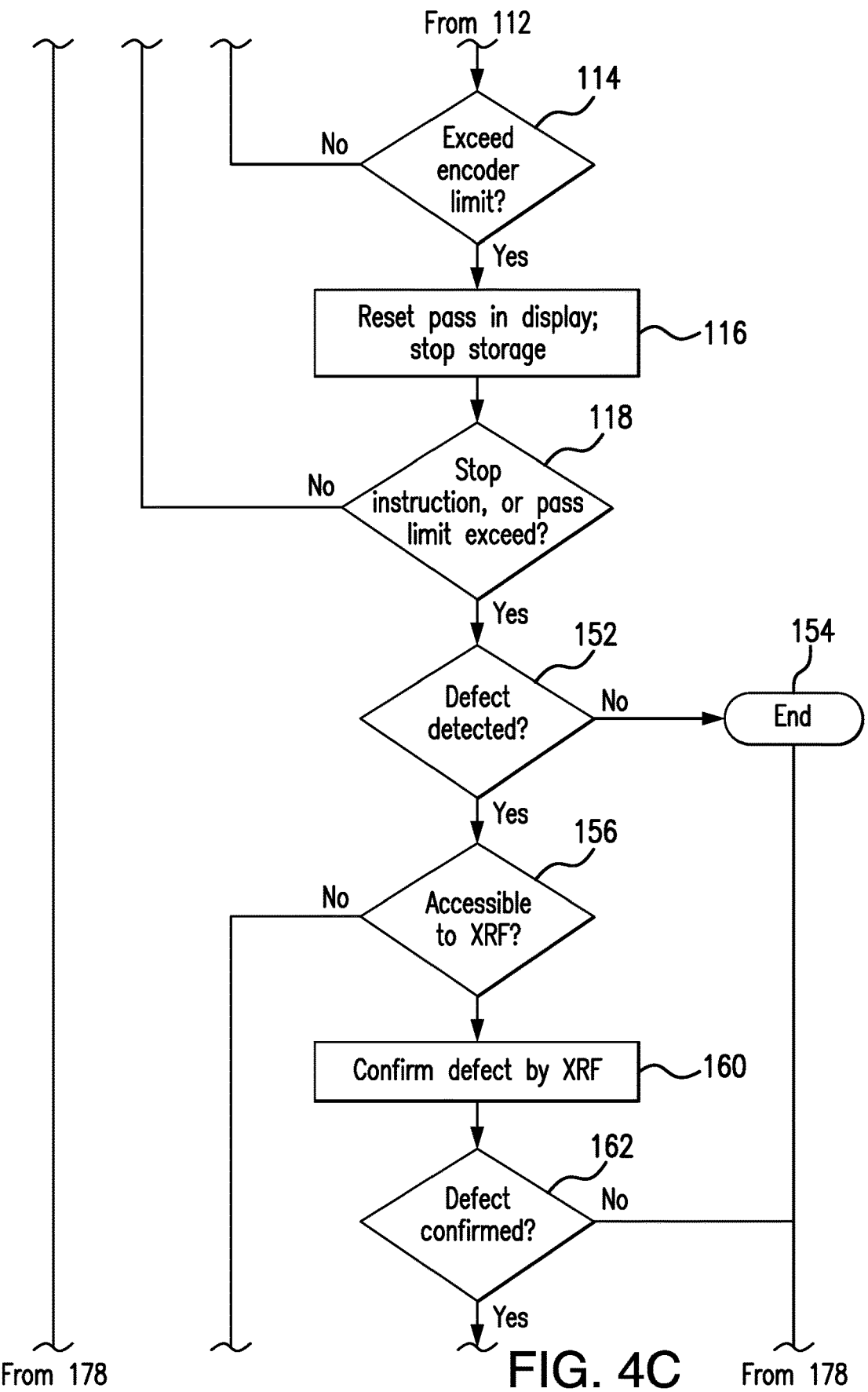
Figure 4D:
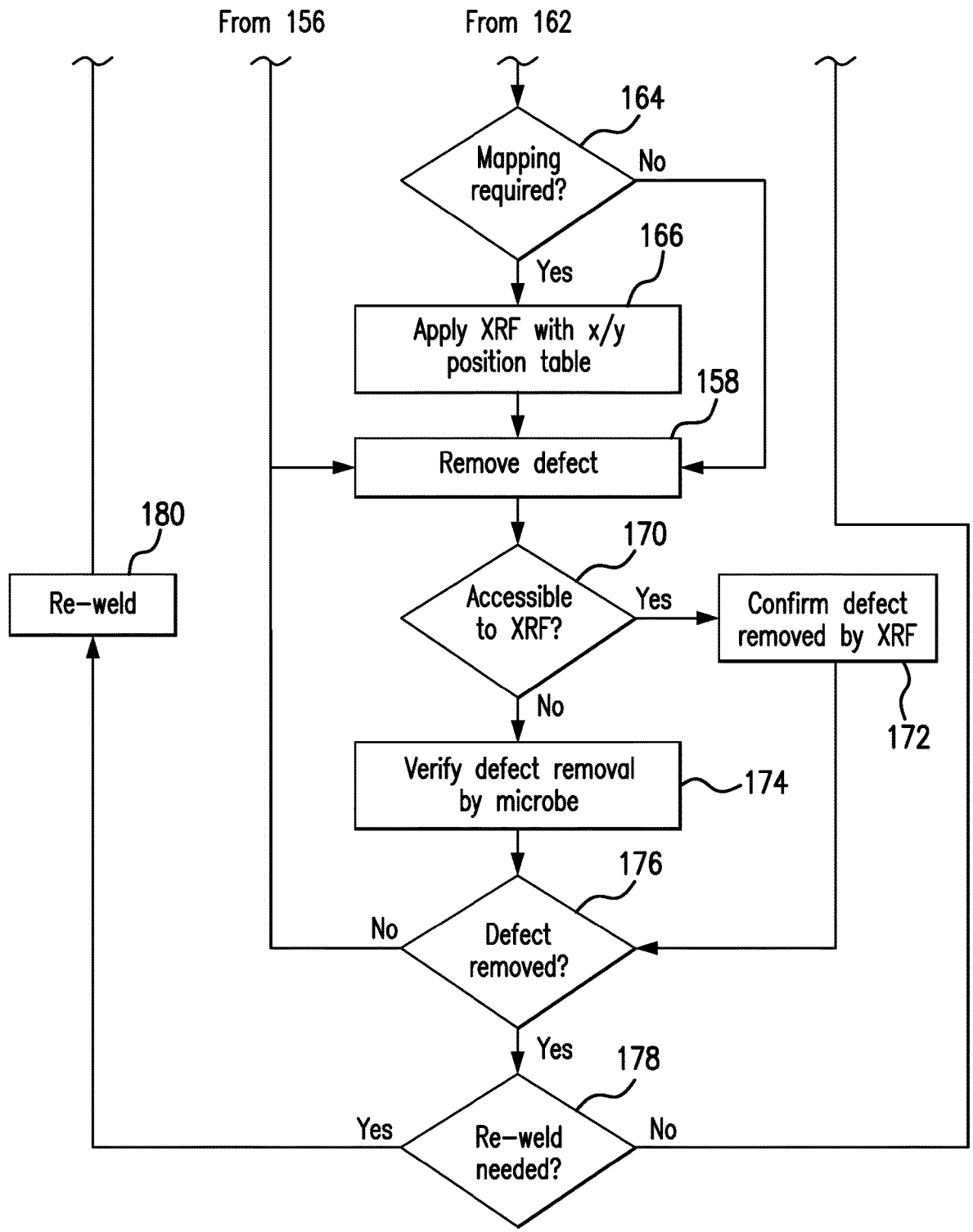
Figure 5:
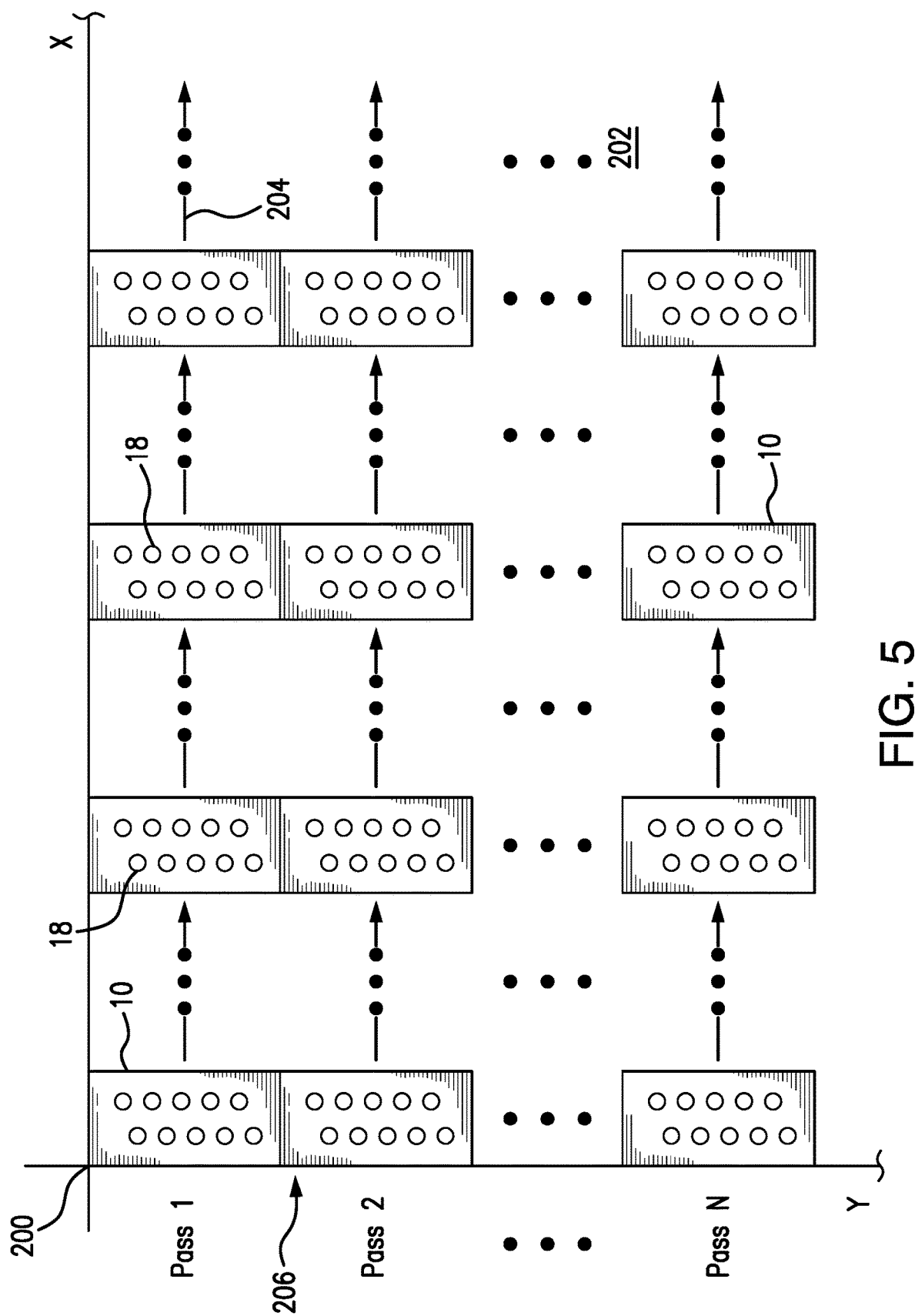

FIGS. 4A-D are a flow diagrammatic illustration of a method for inspection of a material utilizing the systems as in FIGS. 2 and 3; and FIG. 5 is a schematic illustration of a method for inspection of a material utilizing the system as in FIG. 2.

Repeat use of reference characters in the present specification and drawings is intended to represent same or analogous features or elements of the invention.

DETAILED DESCRIPTION

Some example embodiments now will be described more fully hereinafter with reference to the accompanying drawings, in which some, but not all, example embodiments are shown. Indeed, the examples described and pictured herein should not be construed as being limiting as to the scope, applicability or configuration of the present disclosure. It will be apparent to those skilled in the art that modifications and variations can be made in such example embodiments without departing from the scope or spirit thereof. For instance, features illustrated or described in one embodiment may be used in another embodiment to yield a still further embodiment. Thus, it is intended that the present invention covers such modifications and variations as come within the scope of the present disclosure, the appended claims and their equivalents. Like reference numerals refer to like elements throughout.

Further, the term "or," as used in this application and the appended claims, is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an," as used in this application and the appended claims, should generally be understood to mean "one or more" unless specified otherwise or clear from the context to be directed to a singular form. Throughout the specification and claims, the following terms take at least the meanings explicitly associated therein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment" or other similar phrase, as used herein, does not necessarily refer to the same embodiment, although it may. The phrase "at least one of A and B" is satisfied by any of A alone, B alone, A and B alone, and A and B with others. The phrase "one of A and B" is satisfied by A, whether or not also in the presence of B, and by B, whether or not also in the presence of A.

The term "oxide layer" refers to a surface layer of a material which has been oxidized. The term "oxide layer" may be used interchangeably throughout this application with the terms "film" or "oxide film." It should be understood, however, that reference to an "oxide film" herein is for purposes of example only. As should be understood by the present disclosure, the inspection systems and methods described herein can be utilized with various composites having a first layer formed on a different second layer, for example, a titanium nitride film formed on a steel substrate, a polymer film on a glass substrate, or films formed on solar panels, architectural glass, optics, or other devices, or on materials having no oxide layer formed thereon. Moreover, such inspection systems and methods may be used with non-composite, single layer materials that may or may not have an oxide layer formed thereon. Accordingly, the detailed description herein providing one or more examples of systems and methods for inspecting composites comprising oxide layers on metal substrates should be understood to be exemplary in nature and not limiting of the present disclosure.

As should be understood, reactive metals are those metals that react readily with oxygen, water, or acids. Reactive metals can be useful in corrosion resistance because their surfaces oxidize almost instantly when exposed to air, thereby forming a composite in which the oxide layer is a barrier to further ionization/corrosion of the metal's surface. Following the initial surface oxidation, a film continues to grow as a result of ion diffusion and electron tunneling through the existing surface film to the underlying metal surface, but the film eventually grows to a thickness at which these processes cease. On most such metals, without the application of methods to enhance such formation, an approximately five nanometer ("nm") thick uniform oxide layer (or "natural" layer) forms. Applying an external electrical potential (e.g. via an electrochemical cell) to the metal, so that the metal acts as an anode in an electrolysis process, can overcome the film's normal tunneling barrier and allow the oxide film to grow to a thickness up to about two hundred nanometers. Such electrically-enhanced films (above around five nm and up to around 200 nm, and in particular within a range of about 100 nm to about 200 nm) may be considered "thin" films. Alternatively, exposing the surface to higher temperatures and/or pressures can increase the ion diffusion rate and thereby allow the oxide film to grow to several hundred nanometers. Such films (above about 200 nm in thickness) may be considered "thick" films. Oxide layers, whether grown in an unassisted manner or as thin or thick films, provide corrosion resistance to a substrate metal material beyond that provided by user-applied processes by further limiting or preventing diffusion of oxygen into the bulk of the material. However, the presence of impurities in the oxide layer, such as tungsten, carbon, nitrogen, or the like, may degrade the film's corrosion resistive properties, thereby creating a corrosion threat to the underlying metal (which may be an alloy). As a result, it is known to inspect metal surfaces having such films in order to detect the presence of such impurities, e.g. by visual inspection and determination of mass gain. In the former technique, a user visually inspects the oxide film to detect discontinuities in the surface film's color, intensity, or pattern, any of which could indicate the presence of an impurity that could indicate a weak point in the film. In the latter, the metal's surface area is determined, and the metal is weighed before and after the film's formation. Given the surface area, the weight increase can be correlated to mass increase per unit area and, in turn, oxide film thickness according to known techniques, such as provided by ASTM standards.

Abnormal film characteristics, such as film thickness variation caused by surface flaws, material contamination, surface contaminants, or the like, may be apparent due to the contrast between affected and unaffected areas in the visual spectrum and, thus, detectable through visual inspection. Mass gain and appearance inspection techniques may be limited in their effectiveness, however, in identifying abnormalities in the oxide layer due to the imprecise and sometimes subjective nature of their assessment. Visual inspection can be logistically difficult in certain circumstances and can require the operator to have sufficient experience to recognize differing appearances of the film surface. To the extent the human inspector relies upon diffuse reflection, the specific wavelength contrast effect may be significantly reduced or indiscernible (from the standpoint of visual inspection). Further, where the contrast arising from a thickness variation exists in a part of the electromagnetic spectrum (e.g. ultraviolet or infrared) to which the eye is not sensitive, inspection by reliance on the naked eye can be incomplete. Moreover, such methods are inherently ineffective in identifying abnormalities, e.g. in welds, on metals upon which oxide films do not develop. Exemplary systems and methods as disclosed herein may provide an improved inspection of oxide films on corrosion resistant alloys (such as zirconium), or on materials on which oxide films may not form, through the use of eddy current testing and spectroscopy, creating more reliable methods by which to detect substrate abnormalities and reducing the number of false positives for contamination.

One or more example processes described herein enable increased reliability in finding regions of abnormal film or other flaws in a sample material, regardless whether an oxide film is present. Such processes may be more reliable than current methods of measuring the weight gain of specimens or visual inspection compared to a standard because, for example, they rely on inspection by X-ray fluorescence, which can provide detailed analytical data without visual inspection's subjective nature. X-ray fluorescence can be limited, however, by its ability to cover only a small area of the material under test in a given measurement and by the relatively long period of time needed to acquire a measurement. In one or more embodiments, eddy current testing, which can be used to scan a larger area in less time than can be effectively covered by X-ray fluorescence testing, is used to scan comparatively larger areas of the material under test in a pre-screening mode, prior to applying the X-ray fluorescence test. Eddy current testing may respond to a wider range of material flaws than does X-ray fluorescence testing but might not be arranged to specify the identity of many, or any, of such flaws beyond the general identification that a flaw exists. Further, eddy current testing systems may require consistent contact between the eddy current test probe and the surface of the material under test, in that the probe's disengagement from the test material surface may negatively impact the effectiveness of the probe's measurement. Thus, eddy current testing may be ineffective in acquiring measurements on test material surfaces that are sufficiently rough or uneven to cause a partial probe lift off but that may nonetheless be subject to accurate measurement by X-ray fluorescent testing, which does not require a smooth surface. Thus, certain embodiments of testing systems and methods disclosed herein may allow the preliminary identification of potential areas in the material under test in which flaws might be present, followed by the application of the X-ray fluorescence test to those areas, rather than to the material under test as a whole. Such systems and methods may thereby leverage the speed of the eddy current test device to locate potential flaws over a wide area of the material under test with the analytical capacity of the X-ray fluorescence test to provide quantitative and/or qualitative analyses.

Figure 1A:
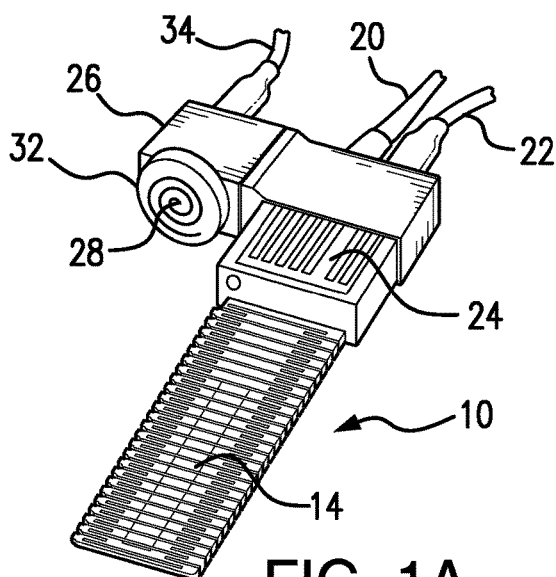
FIG. 1A is a perspective view of an eddy current probe for use in a system and/or method for inspection of a material as provided herein.
Figure 1B:
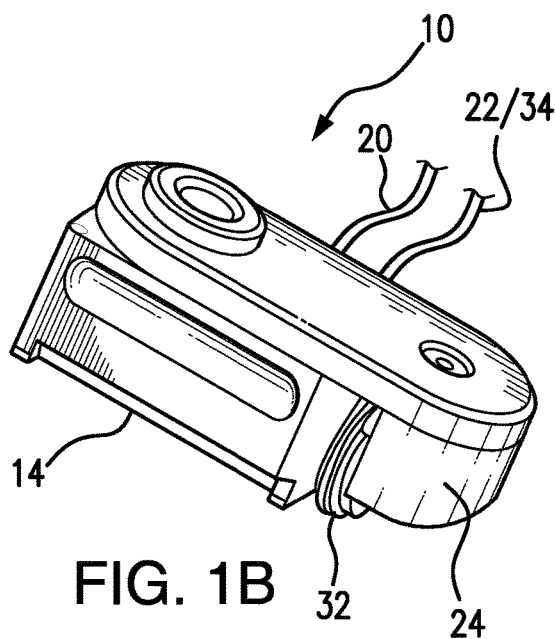
FIG. 1B is a perspective view of an eddy current probe for use in a system and/or method for inspection of a material as provided herein.
Figure 1C:
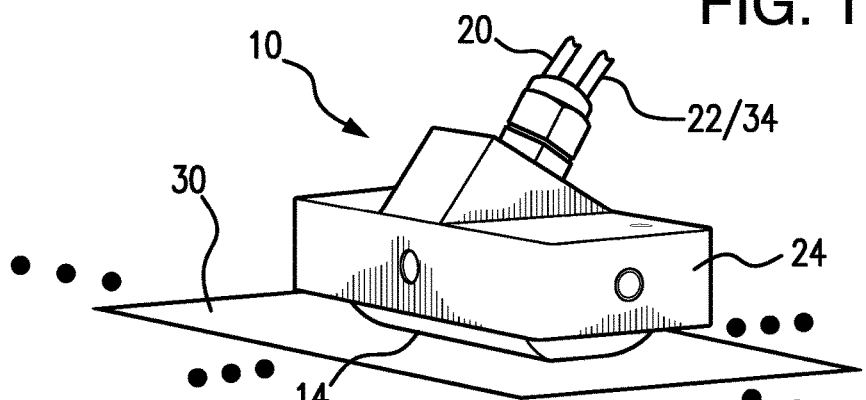
FIG. 1C is a perspective view of an eddy current probe for use in a system and/or method for inspection of a material as provided herein.

FIGS. 1A, 1B, and 1C illustrate examples of eddy current probes 10 that may be used within eddy current test system 12, as shown in FIG. 2. Each eddy current probe 10, for example, an eddy current probe marketed under the name SURF-X by Zetec, Inc. of Snoqualmie Wash., is operable by hand. Referring to FIG. 1A, eddy current probes 10 includes a flexible web portion 14 in which an array 16 (FIG. 1D) of electrically conductive coils 18 is disposed. At one end of the elongated flexible web, a wiring harness (not shown) secures the wire leads from the respective coils 18 and connects them to a power input line 20 and to a signal line 22. The wiring harness is received by a rigid molded polymer housing 24 having an extension 26 that receives a rotary encoder 28 therein. In operation, an operator grips housing 24 with one hand, places probe 10 onto the surface of a sample material 30 (FIGS. 1C and 3) under test while holding flexible web 14 down flat against the surface of material 30 with the operator's other hand. While a data acquisition unit (described below) provides power to the coils and monitors the coils for response signals, the operator then guides probe 10 over the surface of material 30, holding flexible web 14 flat against that surface. Web 14's flexibility allows the web to conform to non-planar surface features of test material 30. As the operator moves probe 10 over the surface, engagement between rotary encoder 28 and the surface of test material 30 causes a wheel 32 of encoder 28 to rotate, thereby actuating a sensor within the encoder that generates a signal upon completion of a predetermined angular rotation of wheel 32. The encoder outputs signals that correspond to, and thereby identify, the occurrence of the angular rotations, via an output wire 34.

Figure 1E:
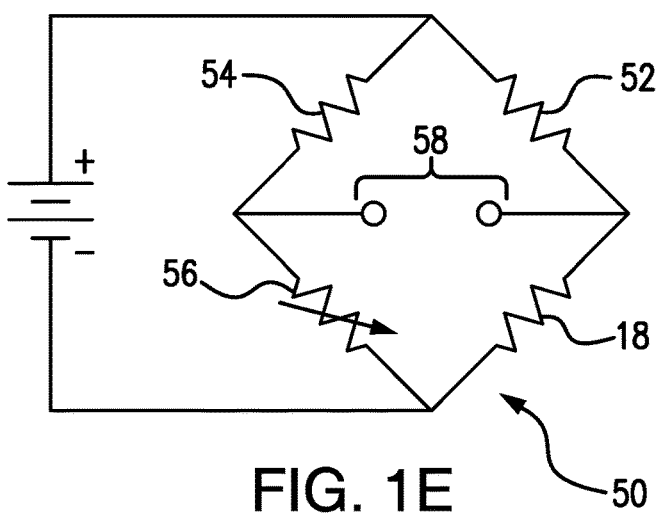
FIG. 1E is a schematic illustration of a Wheatstone bridge measurement arrangement for use with the coils in the array as illustrated in FIG. 1D.
Figure 1D:
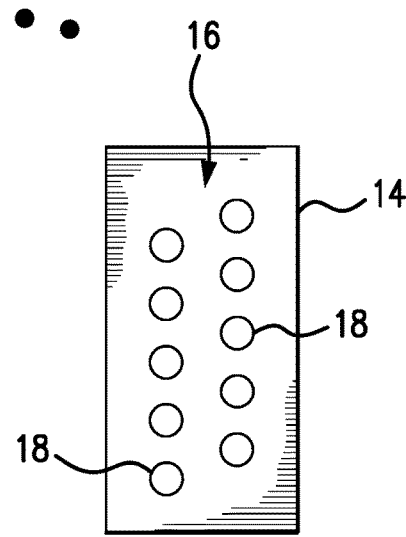
FIG. 1D is a schematic illustration of a coil array for use in a probe as in FIGS. 1A-1C.

Referring to FIGS. 1B and 1D, another embodiment of a probe 10 includes a rigid polymer housing 24 that encloses the surface of a web 14 that encloses an array 16 of electrically conductive coils 18 arranged linearly along the direction of elongation of web 14. Housing 24 also secures a wheel 32 of a rotary encoder, the remainder of which is disposed within housing 24. In operation, the operator holds housing 24 so that the surface of web 14 engages the surface of test material 30 (FIGS. 1C and 3). While a data acquisition unit (described below) provides power to the coils and monitors the coils for response signals, the operator, holding housing 24, moves probe 10 so that the surface of web 14 slides over the test material surface. This also causes the rotation of encoder wheel 32, in turn causing the encoder to generate signals corresponding to a predetermined increment of the wheel's rotation. In a still further embodiment of a probe 10, as illustrated at FIG. 1C, a housing 24 holds a web 14 so that the web surface can be engaged by its application to the surface of test material 30 by the operator. A rotary encoder (not shown) may be provided in the housing so that as the operator moves the housing over the material under test, the coil array obtains data corresponding to the test material's composition and construction, outputting that data over a signal line 22. The rotary encoder or other type of encoder, such as a magnetic or optical encoder, generates a signal at each predetermined distance movement of the probe. Thus, the signals output by the probe correspond to features of the material under test and the distance travelled by the probe in acquiring qualitative and quantitative signals.

Referring to FIG. 1D, web portion 14 houses, in this illustrated example, two rows of five coils 18 arranged in parallel but offset from each other so that the coils of each row are aligned, laterally, between adjacent coils of the other row. A data acquisition unit (discussed below) has an AC power source that drives an AC electric current in each of the coils, e.g., sequentially, at a predetermined frequency, thereby generating an alternating magnetic field proximate the activated coil. When the web portion is placed upon the test material surface as described above, the alternating magnetic field induces eddy currents in the test material in a direction that opposes the magnetic field induced by the coil. This, in turn, produces respective counter-magnetic fields that affect the loading on the coil and the coil's resultant impedance. Referring to FIG. 1E, each coil is electrically disposed within a bridge circuit 50 so that the coil 18 is one leg of the bridge. A first reference resistor or coil 52 forms the reference leg to coil 18. On the other side of the bridge is another reference coil 54, having another known impedance, and a variable-impedance coil 56. When the probe surface is adjacent to the test surface, such that an eddy current is induced that affects the impedance of coil 18, the probe electronics vary the variable impedance 56 until the probe electronics detect that the voltage drop at 58 across the bridge node between coil 18 and first reference coil 52 and the bridge node between second reference coil 54 and variable-impedance coil 56 is zero. In this condition, the impedance of variable-impedance coil 56 defines a ratio in relation to the known impedance of second reference coil 54 that is also the ratio of the impedance of coil 18 to the impedance of first referenced coil 52, thereby identifying the impedance of coil 18, which the probe electronics calculates. Probe 10 (FIGS. 1A-1C) outputs this data to the data acquisition unit via signal line 22. The probe electronics may include a bridge measurement circuit and an independent electric current connection for each coil 18, thus allowing each coil in the array to be driven and measured independently of the other array coils and allowing the coils or groups of coils, as discussed below, to be driven and measured simultaneously or non-simultaneously with each other.

A processor within the probe may control the driving of each probe with electric current, the acquisition of measurement data from the respective bridge circuits, the association of the acquired measurement data with data identifying the coil from which the measurement data was acquired and/or its position in the array, and the output of that combined data in a measurement signal over signal line 22. When the probe operates the coils independently of each other (e.g., activating and reading each coil at a time when all other coils in the array are inactive), the processor acquires measurement data with the coil that the processor is driving and reading at that moment. Each coil is associated in the probe's memory with an identifier unique to that coil among the array of coils. The identifier may include a representation of the coil's location in the array (e.g., the identifier may correspond to a spatial location stored in memory at computer 42 in a lookup table, at which each coil identifier is associated with that coil's spatial position at the probe surface). Thus, when the processor drives and acquires measurement data from each coil, the processor has acquired coil measurement data that, for each coil, is associated with that coil's unique identifier, which may represent that coil's position in the array and on the probe. As discussed below, a data acquisition unit acquires the measurement signal from the probe over the signal line and provides the corresponding data to an application operating on a computer device local to the operator. The application that receives this data can thereby associate the received measurement data with the position on the probe surface from which that measurement signal and its corresponding data was acquired. As noted, the probe processor may also associate the measurement and coil identification data with the encoder data before sending the combined data up to the data acquisition unit, or, as discussed above with respect to FIG. 1A, the encoder may communicate the encoder data to the data acquisition unit separately. In the latter arrangement, the data acquisition unit associates the encoder data with the corresponding measurement/coil identification data the processor sends to the data acquisition unit in parallel therewith. Because the system, as described below, may also track the probe's position on the test material surface, the knowledge of the probe's position on the surface, coupled with the knowledge of the coil's position within the probe, allows the application to associate the acquired measurement data with a position on the test material surface.

As should be understood, when the probe's array surface is applied onto the surface of test material 30 so that the probe surface engages the test material surface and coils 18 are adjacent the material surface, the individual coils 18 induce eddy currents in the test material at positions in the test material directly opposite the respective coils such that each induced eddy current affects the load and the impedance in its corresponding array coil but may also affect impedance in the other array coils. The discussion above assumes that the probe electronics drive the coils 18 individually and, correspondingly, acquire measurement data from each coil individually, without regard to the operation of other coils in the array. That is, each individual coil is driven by the AC power source as the transmitting coil, and monitored for its response as the receiving coil, without simultaneously driving or monitoring the other coils in the array, such that that one coil comprises the entire scan channel operated at that moment. The remaining coils are then driven/monitored, individually and sequentially, so that each coil comprises a scan channel in its turn. For ease of explanation, the remainder of the present discussion assumes such operation, but it should be understood that other modes of operating the coils are known and can be applied. Thus, for instance, groups of adjacent coils, rather than single coils, can be driven and/or measured as an individual scan channel, independently of the other coils in the array, in sequence with activation and measurement of other such groups of coils in the array. In certain such modes of operation involving multi-coil scan channels, one or more coils within the array may be driven by electric current, thereby acting as the transmitting coil(s) in the sense of inducing eddy current in the test material surface, while one or more other coils in the array may be used to measure the effects of those eddy currents in affecting coil impedance of those one or more other coils as discussed above, so that the other coils thereby act as receiving coils for a given scan channel in its measurement. In some embodiments, for example, a scan channel's single transmitting coil is driven while simultaneously monitoring two or more, for example, three, receiving coils that do not include the transmitting coil. In other embodiments, a scan channel comprises two or more transmitting coils that are driven while simultaneously monitoring two or more receiving coils of the scan channel that do not include the transmitting coils. Thus, in certain of the embodiments herein, each scan channel comprises one or more coils, and the eddy current probe processor drives the scan channels sequentially so that only one scan channel is active at one time. In such embodiments, the processor associates the measurement data from each one or more receiving coil in the scan channel with its unique (among the group of coils in the array) identifier, and possibly with encoder data as discussed above, similarly to the single coil embodiments. Such varying modes of operation should be understood in view of the present disclosure and should be understood to be encompassed by the present disclosure as accompanying the single-coil operation mode more specifically discussed herein as an example.

As noted, the probe's processor and electronics also acquire data from the probe's encoder and output that data via signal line 22/34 in association with the measurement data acquired from the respective coils 18 and the coils' respective identifiers. In embodiments in which the encoder includes a rotary wheel, such as illustrated at 32 in FIGS. 1A and 1B, the wheel engages the test material surface when the operator applies the probe to the test material surface so that the coils 18 are proximate the surface. As the operator moves the probe across the material surface, the wheel rotates about a single axis. A sensor, for example, a Hall effect or magnetoresistive sensor, detects the wheel's full or partial rotations and outputs a corresponding signal to the processor. These signals correspond to the probe's linear movements across the test surface, depending on the wheel's diameter. In other embodiments, the encoder may include a spherical ball received by a socket in the encoder in which are disposed sensors that detect the ball's rotation about two orthogonal axes, both of which are parallel to the test material's surface if that surface is planar. Thus, in the first such example, the encoder sensor output corresponds to distance the probe has moved in a line, whereas the sensor data output by the second example corresponds to movement within a two-dimensional plane. Upon acquiring measurement data from the coils and position data from the encoder, the probe processor outputs such data in association with each other so that the measurement data may be associated with the probe position data in generating mapped measurement data, as discussed below. Thus, as the operator moves the probe over the test surface, activating each scan channel individually in a predetermined sequence, the probe outputs to the data acquisition unit segments of measured data, each segment corresponding to a single measurement event during which the probe activated a given scan channel and acquired measurement data therefrom. The probe outputs that measurement data, along with the data identifying the scan channel and data corresponding to the encoder position, to the data acquisition unit.

Referring also to FIG. 2, eddy current test system 12 includes a data acquisition unit 36, for example, a data acquisition unit marketed under the name MIZ200 by Zetec, Inc. of Snoqualmie Wash., including a circuit board and associated circuitry disposed thereon, secured within a molded housing made from a glass-filled nylon or other suitable thermoplastic. The housing may include a tray that receives and secures one or more batteries and associated circuitry that provide AC electric power to the probe via signal line 20 so that the probe powers the measurement coils, as discussed above. A signal line 38 connects to a jack 40, that is in electrical communication with the processor and circuitry of data acquisition unit 36, so that signal line 38 provides electrical and data communication between the data acquisition unit processor and a processor of a computer 42. Computer 42 may operate from its own power source or from power provided by the battery internal to data acquisition unit 36.

A power connection port 44 is provided on a side of the data acquisition unit housing to provide an optional access point at which to provide power from an external line power source to the circuitry of the data acquisition unit. When both battery and line power options are provided, line power may supersede the battery power and may be provided both to data acquisition unit 36 and to the probe, as noted above, as well as to computer 42. Jack 40 may comprise, for example, an Ethernet port but may also represent a wireless communication device, for example, utilizing the Bluetooth protocol, such that signal line 38 may also represent a wireless communication between data acquisition unit 36 and computer 42. The protocols and programming methods for communication between such devices should be well understood and are, therefore, not discussed in further detail herein.

The data acquisition circuitry of unit 36 acquires measurement signals, and, therefore, the data corresponding to those measurement signals, output data from probe 10 and its encoder (via signal lines 22 and 34) at a sampling frequency, for example, about 500 kHz. Systems and methods for acquiring measurement data from sampled output signals, as may be used by the data acquisition unit, should be well understood and are not, therefore, discussed in further detail herein. The probe preamplifies and uploads this data to data acquisition unit 36 in analog form. The data acquisition unit digitizes the signal, resulting, for each of the probe's scan channel activations/measurements, an impedance measurement as described above, a corresponding scan channel identifier (e.g. the identifier for a single coil if the scan channel is a single coil, or the identifiers of the coil(s) from which the probe read the measurement data, if the scan channel corresponds to multiple coils), and encoder data corresponding to the encoder's operative position when the probe makes the measurement. The data acquisition unit then uploads the digitized information to computer 42 for analysis by an application program that executes at the computer. The application may be a custom-coded computer program, operable on a computer system as described herein with respect to FIG. 2, that determines the material analysis based upon a material identification selected by the operator, calibration and threshold criteria provided by the operator and/or through the system's use in a calibration operation as described herein, and data acquired by the eddy current probe and the data acquisition unit.

In certain embodiments, the expected value of the impedance measurement, when the test material has no defects, may be obtained by manual entry to the computer application by the operator or in a calibration mode by operating the probe over a sample of the same material as the test material that is known to contain no defects and that has a sufficiently large area so that the relatively broad field of the eddy current measurement should generate a response to the calibration sample that is the same, within a certain variability, as a response from the test material if the test material has a similar lack of defects. The variability may arise, for example, from latent variability in the responses due to microstructural or compositional material differences and from minor surface texture differences between the calibration sample and the test material. As will be understood from the present disclosure, such variability is measurable and may be determined from testing. Upon determination of such variability for a given underlying material and sample material configuration, e.g. through testing, systems as described herein may rely on such variabilities as tolerances for later measurement comparisons as discussed herein. For example, having determined such variabilities through testing, the operator may set the tolerances in the system, as discussed below, to be equal to the testing-determined variabilities or, e.g., to those variabilities plus some additional leeway such as five, ten, fifteen, or twenty percent.

When the operator enters the expected impedance value(s) manually (e.g., through the input/output system and user interface of computer 42 to storage at computer 42 for use by the application) for a given test material, the operator may define a single threshold impedance value for use in measurements acquired from all coils/scan channels, or the operator may define threshold impedance values on a per coil and/or per time-scan channel basis. In a calibration mode, while being passed over the calibration sample, the probe acquires an impedance measurement from each of the coils/scan channels of the probe array, as discussed above, and stores the respective resulting measurement as the respective expected threshold impedances for each coil, or for each multi-coil scan channel, in association with the identifier for that coil/scan channel. In other embodiments, the probe takes multiple measurements per scan channel over time and saves the average of these measurements from each coil/scan channel as the expected threshold impedance for that coil/scan channel, again in association with the scan channel identifier. In other embodiments, the probe averages such per-coil/scan channel impedances, determined as set forth above, over all coils in the probe, or subsets of coils corresponding to respective scan channels, and applies that average impedance value to all coils/scan channels at the probe or to the corresponding subsets of coils. In still further embodiments, the expected impedance values in the presence of uncontaminated materials may be calculated from library data for fundamental parameters and the probe's operating characteristics. It will be understood in view of the present disclosure that there may be slight differences in values for such fundamental parameters for a given material, depending on the source publication.

The system may operate, in one or more examples, with calibrated expected coil-specific threshold impedance values (and their tolerance ranges, which may be entered into the system by the user and may be determined, e.g. in a manner as discussed above, on a coil-specific basis or as a single tolerance applicable to all coils/scan channels in the probe for a given material) only for the situation (for a given material under test) in which the material has no defect. In such embodiments, the data associated with the measurement positions on the test material surface following testing by the probe is binary, i.e., the measured area (e.g., the area in the test material directly opposite an individual coil or group of coils being operated as the scan channel at that moment) either contains, or does not contain, a defect. In other embodiments, however, further calibration can be conducted (similarly to the processes discussed above)

against samples of the test material in which known defects exist. Such calibration samples are made from a given underlying test material with, e.g., one or more predetermined contaminants or with voids or cracks made into the sample. Measurement tolerances for such contaminant-containing and/or other defect-containing calibration samples may also be determined similarly to the methods discussed above. Still further, calibration impedance values may be calculated from a library of fundamental parameters and probe characteristics for materials having known defects. Thus, it should be understood that the calibration methods may vary but may result in the storage by the computer 42 processor, under control of the application, of expected impedance levels (on a per-coil basis, coil group basis, or globally to all coils) associated with the occurrence of one or more predetermined defects in respective predetermined test materials. Upon calibration of the system with multiple such known defects in a known test material, the computer 42 processor, under control of the application, stores a plurality of expected impedance levels (and corresponding tolerance threshold values) on a per-scan channel basis for the given test material, one of which (for each coil/scan channel) is associated with the absence of defects and the remaining being associated with the presence of the respective predetermined defects in that material. Thus, upon acquisition of an impedance measurement from a probe coil/scan channel, the computer 42 processor, under control of the application, compares that impedance measurement with all of the expected impedance values stored in memory for that coil in association with the applicable test material. If the acquired impedance measurement is within the tolerance range of the expected value in absence of a defect, the processor stores data indicating the absence of a defect at the corresponding test material surface area corresponding to that coil. If, on the other hand, the measured impedance value is within the tolerance range of one of the stored impedance levels associated with the predetermined defects, the processor stores data in memory indicating that the defect corresponding to the identified impedance level is present at that area of the test material surface. If the measurement is outside the tolerance range of the expected value in absence of a defect but is within the tolerance level of no predetermined calibration impedance levels, then the processor, under the control of the application, stores data in the memory of computer 42 that a defect exists at the corresponding area of the test material, but without indicating the defect's identity. This condition may occur, e.g., when the material under test has a defect for which the system's calibration procedure did not include a calibration test sample or when the probe lifts off of the test material surface to a degree that materially impacts the impedance measurement. Simultaneously with the acquisition of measurement data and the determination whether such acquired measurement data corresponds to defects, the results of such analysis may be illustrated on a display screen 46 of computer 42.

As noted herein, the example embodiments discussed above assume that a scan channel corresponds to a single coil. As also noted herein, however, an individual scan channel may instead correspond to one or more transmitting coils and one or more receiving coils, where an individual coil may be only a transmitting coil, only a receiving coil, or both a transmitting and receiving coil. In view of the discussion above, therefore, it will be understood that calibration of such systems may be effected in a manner similar to that discussed above for single-coil scan channels, except using the multiple coils for a given scan channel to determine the scan channel's individual calibration thresholds and, for one or more receiving coils of the multiple coils (that the probe uses to acquire measurement data in that scan channel), to determine to which to assign the tolerance ranges therefor. Thus, it will be understood that the discussion above, regarding determination of calibration thresholds and tolerance ranges on a per coil basis, may also be considered to be effected on a per scan channel basis and that this is applicable regardless whether a scan channel is composed of a single or of multiple coils.

In one or more embodiments as discussed herein, the application at computer 42 identifies the impedance measurement associated with a given coil 18 (or, if the system does not utilize single coil scan channels, of a multiple coil scan channel) of the probe and compares that impedance level with a predetermined expected impedance threshold level stored in memory at computer 42 (and accessible by the processor that executes the application) for that coil for a condition at which no defect occurs in the material under test. If the measured impedance level is within (above or below) a predetermined tolerance range (determined as discussed above) about that threshold impedance value, the application determines that the corresponding coil 18 is above an area of the test material that does not contain a defect. The application then stores in memory data indicating that the measurement, which is associated with encoder data identifying the position on the test material surface at which the measurement was acquired, as discussed below, does not have a defect. If, however, the impedance measurement is outside the tolerance range from the expected no-defect threshold impedance value, but is within the tolerance range of a predetermined impedance level of a known defect within the test material, the application stores in memory data indicating that the measurement at the position on that test material surface has the known defect. If, still further, the impedance measurement is outside the respective tolerance ranges from all the pre-stored impedance threshold values, the application stores in memory data indicating that the measurement at the position on the test material surface may include a defect.

FIG. 2 includes a block schematic diagram of a computer 42 that performs the eddy current analysis as discussed herein. Computer 42 may be a computer system in the possession of a user 60 or may be a server at a locationally remote data center accessed by the user via a local computer system over a wide area network such as the Internet. Computer 42 may be a server, a non-server computer system such as a personal computer or a mobile device, or may comprise a plurality and/or combination of such computer systems, but is generally a computing device or device capable of effecting the communications and functions as described herein. Where computer 42 is a server accessible over a local area network or at a locationally remote data center accessible over a wide area network such as the Internet, the computer system may be considered to include a workstation, mobile computer, or other device through which such access is effected. In general, it should be understood that a single computer system need not execute all the computer-related steps discussed with respect to FIG. 4 and/or otherwise disclosed herein and that multiple computer systems can be utilized. A database 62 may be a part of computer 42 or may be accessible by the computer system over a local or wide area network. Database 62 may store calibration data (e.g. non-defect expected impedance values, defect-specific impedance values, and respective range tolerance thresholds thereabout) and operational parameters, e.g. as discussed herein, and may comprise one or multiple databases.

One or more of the methods as discussed herein is embodied in or performed by an execution module 64. Execution module 64 may be a self-contained software system with embedded logic, decision making, state-based operations and other functions that may operate in conjunction with collaborative applications, such as web browser applications, software applications, and other applications that can be used to communicate with an operator, and in the illustrated embodiment comprises computer-executable instructions stored on a computer-readable medium, for example, embodied by a processor such as a microprocessor or a programmable logic controller (PLC). Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, a tangible storage medium such as a random access memory (RAM), a read-only memory (ROM), an erasable programmable read-only memory (EPROM or flash memory), a non-volatile memory supporting a PLC, memory incorporated into a processor, or other optical or magnetic storage devices. Such a computer program typically is comprised of a multitude of instructions that may be translated by a computer into a machine-readable format and hence executable instructions. In the illustrated embodiment, computer 42 stores execution module 64 on a file system or memory 66, accesses the execution module from the file system and runs the execution module on a processor 68 that is part of computer system 42. Operator 60 may interact with the self-contained system as part of a process of assessing a test material for defects as described herein.

Execution module 64 may include various submodules to perform the steps discussed herein, including a submodule 70 that interfaces with other computer systems, such as the data acquisition unit and the robots as discussed herein, to thereby allow the operator to upload and/or download information. Interface module 70 also allows the computer system to query and receive data from database 62 and distribute received data to one or more other submodules in execution module 64, as appropriate, for further processing. A query to submodule 72 may take the form of a command message that presents a command to the appropriate computer system or database, such that module 70 in turn compiles the command and executes the requested function, such as retrieving information from database 62.

Execution module 64 may also include graphical user interfaces ("GUIs") 74. Execution module 64 may present, for instance, one or more predetermined GUIs 74 to permit a user to input/select data into the system, direct computer 42 to perform various functions, define preferences associated with a query, or input other information and/or settings. GUIs 74 may be predetermined and/or presented in response to attempts by the user to perform operations, such as those discussed above with respect to FIG. 4, execute queries, enter information and/or settings, operate functions of other modules, or communicate with other computer systems. Computer 42 generates the predetermined GUIs and presents GUIs 74 to the user on display 46 of computer system 42, which may be at a local computer device where computer 42 otherwise comprises a server remote from user 60. GUIs 76 can be custom-defined and execute in conjunction with other modules and devices on computer system 42, such as I/O devices 76, the interface submodule, or any other submodule. GUIs 74 present notifications to users and may be used whenever a user desires to transmit or retrieve data between computer systems and/or databases.

Computer 42 may include the above-described display 46, the above-described I/O devices 76, and a speaker 78. Display 46 may present applications for electronic communications and/or data extraction, uploading, downloading, etc., and may display calibration data and eddy current and/or eddy current force data, in isolation or in association with spatial positions on a representation of the test surface, such as a two-dimensional Cartesian coordinate system as described herein. Speaker 78 may present any voice or other auditory signals or information to user 60 in addition to or in lieu of presenting such information on display 46. Computer 42 may also include one or more input devices, output devices, or combination input and output devices, collectively I/O devices 76. I/O devices 76 may include a keyboard or similar means to control operation of applications and interaction features as described herein, as well as hand-held scanners for optically scanning documents for storage in database 62. I/O devices 76 may also include disk drives or devices for reading computer-readable storage medium, including computer-readable or computer operable instructions. Such devices should be understood.

As noted, query module 72 allows a user to query data from database 62 via interface module 70. After transmission of a query message and retrieval of the query results, query module 72 may store the retrieved data in the memory for future retrieval.

Execution module 64 also includes a custom module 80. Custom module 80 is a set of computer executable instructions that effects the steps discussed above encompassed by the application. It receives input data, as discussed above, from user 60 either directly via I/O devices 76, GUIs 74, and interface module 70 and/or via the administrator's selection of pre-existing data from database 62 via I/O devices 76, GUIs 74, query module 72, and interface module 70. The custom module determines analysis output data, as disclosed herein, and displays the output data at display 46 and/or to another computer system as output data via a communications port (not shown) and interface module 70. The custom module may also store the output data at database 62 via interface module 70. In those embodiments in which operator 60 manually defines the calibration data, without use of the custom program, the operator provides the calibration data and operation instructions to the custom module via I/O devices 76 and interface module 70. Custom module 80 executes the material defect analyses as discussed herein and displays the output data at display 46 and/or to another computer system as output data via the communications port and interface module 70 and may store the output data at database 62 via interface module 70.

Knowing the position on the test material at which a defect of unknown identity is present, which may occur, e.g., when an eddy current measurement was not made or could not be made (e.g., due to an uneven test material surface that caused the eddy current probe to lift off the surface), based on the eddy current analysis, the operator may utilize an X-ray fluorescence (XRF) test device, e.g., a handheld X-ray fluorescence analyzer marketed under the name X-MET8000 by Hitachi Ltd. of Westford, Mass., to determine defect's identity. Referring to FIG. 3, an XRF spectrometer 48 includes a housing 120 that defines a pistol grip portion 122 in which one or more batteries (not shown) are disposed that are electrically connected to the components discussed herein to provide power thereto. A finger actuatable trigger switch 124 may be depressed to provide battery power to an X-ray source 126 that, when powered by the batteries when a forward face 128 of housing 120 is flush against the surface of test material 30 at the position at which the defect has been determined to occur (or could be measured) by the eddy current system, produces an X-ray beam 130, the energy of which causes certain inner-shell electrons 132 to be ejected from their orbits in individual atoms 134 (shown in an enlarged form) within the defect material. The hole left by the departed electron is filled by an outer shell electron 136 that drops down into the lower orbit. The energy difference between the two orbits, which is released when the outer shell electron drops into the low orbit, is emitted in the form of fluorescent X-ray radiation 138 that is detected by an X-ray detector 140 disposed in housing 120.

Detector 140 outputs a signal that corresponds to and varies with the frequency and energy of radiation 138 to a pre-amplifier 142. Pre-amplifier 142 amplifies the signal and forwards the amplified signal to a digital signal processor 144 that digitizes the incoming signal and collects the X-ray events over time, producing spectral data that the processor passes to a primary processor 146. The spectral characteristics of a range of elements, and the constituencies of these elements within an extensive range of metals, including alloys, when excited by an XRF device are known and stored in memory at 148 in association with the identifiers that identify the metals that correspond to the respective spatial characteristics. Processor 146 analyzes the spectral data received from digital signal processor 144, identifying the various elements present in test material 30, and the alloys such elements compose, in the area immediately adjacent housing face 128 by comparison of the received spectral data with the information provided at memory 148. Having determined the material components of the area beneath the XRF test device, processor 146, under control of a computer program application resident at memory 148 and executed by processor 146, selects the identifier corresponding to the spectral characteristics stored in the XRF spectrometer's memory that the spectrometer determined corresponded to the measured spectral data and drives a display screen 150 to display text that identifies the constituent materials (responsively to the selected identifier) identified by the processor through the X-ray fluorescence analysis.

In a calibration mode, the operator operates XRF spectrometer 48 over respective samples of metals, including alloys, or other materials, that the XRF spectrometer will later test and that are known either to contain no defects or to contain defects that that the operator expects may be encountered in those underlying/substrate test materials. X-ray detector 140 detects the resulting fluorescent X-ray radiation 138. Digital signal processor 144 digitizes each incoming signal (corresponding to a given calibration material sample) and collects the X-ray events over time. Primary processor 146 receives the resulting spectral data and stores that data in memory at the XRF spectrometer in association with an identifier, as noted above, that identifies the underlying material and the defect or absence of defect therein. An operator may enter these identifiers manually, or may select previously stored identifiers from a pre-stored list at the XRF spectrometer's memory, via the XRF spectrometer's input/output system and user interface. Alternatively, the spectral characteristics for each material, or at least some materials, may be calculated from a library of fundamental parameters, and the specifications of the XRF spectrometer, and stored in the spectrometer's memory in association with the corresponding material identifier.

The operation of XRF analyzers should be well understood in this art and is, therefore, not discussed in further detail herein.

FIG. 4, and with continued reference to FIGS. 1, 2, and 3, illustrates an operation of one or more of the embodiments as disclosed herein, with regard to inspection of a weld. It will be understood, however, that the illustrated process is for purposes of example only, and not in limitation of the present disclosure. An operator makes a weld, at 77, and smooths or otherwise finishes the weld, at 79. The operator may calibrate the eddy current system and XRF spectrometer, as disclosed herein, at 81, thereby determining the impedance levels expected in no-defect and defect conditions for the eddy current system and for the XRF spectrometer. The eddy current test system 12 may be activated by actuation of a power switch at data acquisition unit 36, power-up of computer 42, and actuation (via the computer's operating system) of the application program at computer 42, at 82. Upon actuation, the application controls the processor of computer 42 at 84 to prompt the user, via GUIs 74 and display 46, to enter an instruction at 86 to begin a test procedure and to identify at 88 the material type to be tested. Upon receipt of the test material identification, the application at 90 queries for (e.g., from database 62 via query module 72 and interface module 70 or from user input data via I/O devices 76 and interface module 70) and receives data identifying expected impedances for the identified material (e.g. through a look-up table at database 62) when no defect is present and when certain predefined defects are present, and respective corresponding range tolerance ranges thereabout. Upon receipt of a start instruction at 86, the application controls processor 68 at 92 to query data acquisition unit 36, via interface module 70, for measurement data. Initially, when data acquisition unit 36 powers up and sequentially provides power to coils 18 of eddy current probe 10, the data acquisition unit immediately begins acquiring measurement data from the coils as discussed above. Computer 42, thus, immediately begins acquiring measurement data from the data acquisition unit. The processor, under control of the application, however, does not begin assessment of this data with regard to possible defects in a test material until the operator, via the computer's input/output system and the application's user interface, provides an instruction to the application to begin the assessment.

Previously, in calibration of system 12, the processor drives a measurement of impedance of the coils 18 when the coils are in air, i.e., when the probe is not placed onto any material surface (other than air) such that the coils would induce eddy currents in such surfaces. Processor 68 stores this value in memory, e.g. at database 62, for each coil/scan channel in association with the identification of the test material, which the processor acquires through a user prompt, via GUIs 74. When the processor, under control of the application, receives at 86 the operator's instruction to begin a test, the processor assesses measurement data acquired from data acquisition unit 36 at 94, determining at 96 whether the given coil/scan channel measurement data is within the predetermined tolerance range of the in-air threshold. In certain embodiments, the application does not begin a test procedure until detecting that condition for all coils/scan channels, meaning that a test begins when the operator holds the probe in air, away from the test material surface. When the application so detects that starting condition, the application controls the computer processor to display, through the user interface at display 46, an instruction to the user at 98 to place the probe in the operative position at the desired starting position on the surface of test material 30. Choosing to begin the test at some position on the surface of test material 30, the operator at 100 marks that position, for example, with an ink-based marker or a piece of adhesive tape, or simply notes that the start position is a known position on the test material, e.g., at a certain corner or other feature of the test material. At 102, the operator then places the probe at that position on the test material surface so that the probe coils are proximate the test material surface (so that actuation of the scan channels affects coil impedances compatibly with the device calibration) and actuates the probe, which drives the coils/scan channels independently and sequentially, to sequentially induce eddy currents in the test material that, in turn, induce changes in the coils' impedances, as discussed above. The processor at 104, under the control of the application, has continued to sample measurement data acquired from the data acquisition unit. Thus, when the operator places the probe on the test material surface after the application has displayed the operator instruction to do so, the application determines at 106 whether signals acquired by the computer processor from the data acquisition unit indicates that the probe has been placed on the test material surface (e.g., because the application has obtained measurement data from each coil/scan channel that is within a predetermined range of the respective calibration measurements made on the test material). If so, the application at 108 determines that the test has begun and assesses the initially-acquired measurement data that corresponds to presence or absence of a defect in the test material. The application, at 110, stores the corresponding defect/no-defect/possible defect information in memory in association with data indicating the measurement was acquired at the starting position, and for the selected test material, and provides, at 112, an illustration on display 46 showing a rectangular area to indicate the test material surface with an indicator at the top left corner thereof of the result of the test analysis: e.g., if a no-defect condition is detected at that position on the test material surface because the impedance measurement is, at 108, within the tolerance threshold of the expected threshold impedance associated in the computer 42 memory with the material under test (with no defects) as identified at 88 and for which data was acquired at 90; if a defect is detected at that position on the test material surface because the impedance measurement is, at 108, within the tolerance threshold of the expected threshold impedance for a predetermined defect represented in the data acquired at 90 (the display illustrating the identity of the detected defect at that position); or if a possible defect is detected at that position on the test material surface because the impedance measurement is, at 108, not within the tolerance threshold of any expected threshold impedance (including the no-defect impedance threshold) stored at database 62 for the test material selected at 88. If the assessment detects that such a possible defect is present, i.e., without the identity of a particular defect, the data stored and displayed indicates the present of a possible defect but does not display a particular defect identification. For example, the system displays a possible defect when the eddy current test probe lifts off of the test material surface due to the surface's rough or uneven form but short of a complete in-air condition. The application returns to 108 to assess the next measurement, which the processor may have stored following acquisition at 106, and the process repeats.

It will be understood that custom module 80 (FIG. 2) may be configured to provide various displays of the measurement data, as may be desired, and that the presently discussed examples are provided only for illustrative purposes. Moreover, the custom module may be configured to perform various functions, e.g. to allow the user (e.g. via a GUI) to select data for output to a different device.

Also at startup and step 92, the application controls the processor of computer 42 to query data acquisition unit 36, and thereby the processor of data acquisition unit 36, for identification of the type of probe attached to the data acquisition unit. The data acquisition unit, in response, sends a query signal via line 22 to the processor of probe 10. Probe 10 responds with data stored in the probe's memory, indicating the number of coils in the probe, the respective unique (among the group of coils) identifiers for the coils in the array, the spatial position of the coils (identified by their identifiers) with respect to each other (including, e.g., each coil's/scan channel's dimensions and the center-to-center spacing of the coils/scan channels with respect to each other) and with respect to the probe surface, the probe's dimensions and the coil/scan channel array's position within that geometry (thereby enabling the application at computer 42 to locate each coil/scan channel with respect to the measurement starting point and as the probe moves with respect to that starting point as reflected by the encoder data), and the type of encoder used with the probe, including, for example, whether the encoder provides one-dimensional linear position information or two-dimensional position information, e.g., from a rolling ball or other device. Acquiring the response data, the data acquisition unit provides this information to the processor of computer 42 via line 38. Knowing the spatial arrangement of the coils/scan channels, and assuming, e.g., that each scan channel corresponds to a single coil (as described above) in an elongated array of coils extending from the starting point in the top, left corner of the display downward, the application determines the position of each coil on the test material surface with respect to the presumed starting point at the top, left corner of the display, stores each coil's measurement data at 110 with position information relative to that starting position, and displays each coil's acquired measurement information on the display at 112 at its position relative to the presumed starting point at the top-left corner. If the information that the application receives from the probe via the data acquisition unit indicates that the encoder operates only linearly, then as the operator thereafter moves the probe over the test material surface (and the processor, under control of the application, acquires corresponding coil measurement data from the probe via the data acquisition unit and receives encoder data from the probe via the data acquisition unit), the application assumes that the operator is moving the probe in a straight line away from the starting position, each such linear movement being referred to herein as a "pass."

Presuming also that the starting position is the origin of a two-dimensional Cartesian grid, the processor stores coil measurement data in memory at 110 in association with changing position information from the encoder, presuming movement along one (the "first") of the Cartesian axes but not the other (the "second"). Thus, referring to FIG. 5 and assuming the origin 200 to be the top left corner of a quadrant 202 of the Cartesian space, as the operator moves the eddy current sensor probe 10 linearly, the application presumes the probe is moving to the right, with the two parallel rows of coils 18 (see also FIG. 1D) extending downward, parallel to the Y axis, as the probe moves in a direction (indicated by arrows 204) parallel to the X axis and immediately below the X axis. The application samples the data acquisition unit frequently, e.g., at approximately 260 samples per second, but the changes in encoder values establish positions in the X direction at which the application stores measurement data for the array. Since the application acquires measurements for each coil on the probe surface, the X value associated with a given coil's measurement data is the number of encoder value changes since the pass started, minus the width of the probe surface in the X direction, plus the distance in the X direction from the left edge of the probe surface to the coil being measured. The Y value for each coil measurement is the pass number, multiplied by the probe's length in the Y direction, minus one probe length (in the Y direction), plus the distance (in the Y direction) from the top of the probe surface to the coil being measured. The application knows the X/Y position of each coil on the probe face from the probe data acquired at 92. That is, the position data stored in association with a given measurement in memory corresponds to the distance from the origin in the direction of the first axis represented by the encoder data when the measurement is made and the distance in the direction of the second axis defined by the position on the probe of the coil/scan channel and the probe's pass location (i.e., in this example, first or subsequent measurement pass, as described herein). Simultaneously, the application displays each coil's acquired measurement data at 112 (including, e.g., a no-defect indicator, a defect indicator identifying the detected defect, or a possible defect indicator), on a rectangular area displayed at display screen 46 of computer 42 (FIG. 2), at the X/Y position discussed above with respect to an origin point at the top left of the rectangular area. The application stores each measurement in association with its indicator and with the position in the Cartesian coordinate system at which the measurement is made. The application continues this process until detecting at 114 the first-to-occur of (i) detection of coil measurement values outside the predetermined range of values acquired during calibration on the test material, thus indicating that the probe has been lifted off of the test material, and (ii) an accumulation of encoder data reaching a predetermined limit. When the first of these events occurs, the application, while continuing to acquire measurement data from the data acquisition unit at 104, stops at 116 storing measurement data in memory and displaying measurement data on the display at screen 46. The computer processor, under control of the application, then drives the display at screen 46 to display to the operator an instruction notifying the operator that the first measurement pass has ended and instructing the operator to place the probe at a start position for the second pass. Returning to step 102, the operator picks up the probe and places it back on the test material surface at the position at which the second pass is to begin.

Still referring to FIGS. 4 and 5, the application presumes that the second measurement pass begins at a position 206 on the test material surface offset from the initial starting position, as described above, by a distance equal to the length of the probe, in the Y direction, or the probe length in the direction of the second axis in the predetermined Cartesian coordinate system. The instruction at the display at screen 46 (FIG. 2) instructs the operator to place the probe in that position. The processor, under control of the application, continues to acquire measurement data from data acquisition unit 36 at steps 104 and 106. Upon thereafter detecting measurement data indicating that the user has applied the probe again to the test material surface, presumably at the correct starting position for the second pass, the application assesses the presence or absence of a defect at that position, and stores defect/no-defect/possible defect information in the database in association with the relevant coil's position in the Cartesian space with respect to the origin 200. As the operator moves the probe across the test material surface, the application acquires the subsequent measurement data as discussed above with regard to the first pass and stores and displays the results of the analyses thereof at 110 and 112 based on an assumption that the probe moves in the first direction away from the starting point of the second pass by an amount equal to the accumulated encoder data from the start of the second pass but does not move in the second dimension. In other words, the application assumes that the second pass extends below and parallel to the first pass. The second pass ends upon the first-to occur of the same two events as set forth above with respect to the first pass.

This process repeats so that the application acquires measurement data from the probe's subsequent passes over the test material surface, the application assuming that each pass extends immediately below and parallel to the immediately preceding pass, until the first-to-occur at 118 of (i) the user entering a stop instruction to the application via the input/output system of computer 42 and the application's user interface and (ii) the application's acquisition of measurement data in a number of passes as described above equal to a predetermined limit. Upon the first-to-occur of these events, the processor, under control of the application, drives the user interface at the display at screen 46 (FIG. 2) to display a message to the operator that a full measurement set has been acquired. The processor, under the control of the application, stores the measurement data of the above-described passes in association with an identifier that is unique with respect to identifiers associated with any other set of measurement data the application presently maintains in memory, causes the application to retrieve any desired, previously-stored set of measurement data and display the data at screen 46, and outputs the data to an external computing device and/or prints the data to a hard copy form. The operator can acquire further sets of measurement data, each time marking the beginning position of the measurement set on the test material surface, thereby accumulating eddy current measurement data over as much of the test material surface as desired.

In the above-described example embodiments, the application stores, in a two-dimensional Cartesian system, measurement data from eddy current probe measurements made on a test material surface that may vary in three dimensions. This dimensional difference between the test material surface and the map surface in which the measurement data is stored may give rise to a certain degree of inaccuracy between the test surface and the map surface. For test surfaces with sufficiently low variability to permit consistent application of the eddy current probe, however, such inaccuracy should be sufficiently low that the two-dimensional map accurately represents the measurement locations on the test material surface.

It should be understood that the system and method discussed above is provided for purposes of example only and that other systems and methods of operation fall within the present disclosure. For example, in the system including a two-dimensional encoder, the application again assumes a beginning of an acquisition of test data to occur at the origin of a two-dimensional Cartesian coordinate system but, then, accumulates, stores, and displays acquired measurement data in association with the two-dimensional encoder data as that data establishes distances within the two-dimensional Cartesian area away from the beginning origin point. As long as the operator does not move the probe away from the origin point beyond a predetermined boundary enclosing a space within the Cartesian coordinate system about the origin, the application continues to acquire, store, and display the measurement data. Thus, in such an embodiment, steps 77 through 112 at FIGS. 4A-4D occur as discussed above, while steps 114 and 116 are omitted. If, at 118, the operator lifts the probe off of the test material surface or moves the probe beyond the predetermined limit, or if the operator submits a stop command through the computer's input/output system and the application's user interface, or if a predetermined distance, defined as a predetermined encoder distance limit, is traveled, the application ends the measurement pass and stores the measurement data in memory as a measurement set, again in association with a unique identifier.

In a still further example, the system includes a robot that is capable of traversing the test material surface under its own power in two dimensions (e.g., within the two dimensional Cartesian coordinate system as discussed above where the test material surface is flat) and in which the eddy current probe is mounted so that, when the robot is placed in its operative position in which the robot's wheels or other motive means engages the test material surface to move the robot thereon, the probe coils are proximate the test material surface so that actuation of the coils enables the system to acquire measurement data as described above. In one or more embodiments, the robot includes one or more springs or other resilient members under compression between the robot housing or frame and the probe so that the springs bias the probe's coil array surface toward engagement with the test material surface when the robot is operatively disposed on the test material surface. Thus, as the robot moves over the test material surface, the springs apply pressure to the probe that maintains the probe in contact with the test material surface as the robot moves. The robot may include, for example, a two-dimensional encoder that actuates in response to the robot's movement, e.g., through engagement with the test material surface or through engagement with the robot's drive mechanism to thereby output signals to computer 42 and the application indicative of the robot's two-dimensional movements. The application controls the robot's movements through signals provided by the application via computer 42 to the robot, e.g., through a Bluetooth or other wireless or wired communication channel. The operator may input instructions to the application through the computer's input/output system regarding a desired movement of the robot on the test material. Alternatively, the application's computer instructions may be pre-programmed to move the robot in a predetermined movement sequence from a starting point. The application again assumes a beginning of an acquisition of test data to occur at the origin of a two-dimensional Cartesian coordinate system, thereafter accumulating, storing, and displaying acquired measurement data in association with the two-dimensional encoder data as that data establishes distances within the two-dimensional Cartesian area away from the starting point. Thus, in such an embodiment, steps 77 through 112 at FIGS. 4A-4C occur as discussed above, while steps 114 and 116 are omitted. As long as the operator does not move the probe (via movement instructions to the robot entered through the input/output system to the application) away from the origin point beyond a predetermined boundary enclosing a space within the Cartesian coordinate system about the origin, the application continues to acquire, store, and display the measurement data. If, at 118, the operator lifts the probe off of the test material surface (or if, for another reason, the probe moves off the test material surface) or moves the probe beyond the predetermined limit, or if the operator submits a stop command through the computer's input/ output system and the application's user interface, or if the application completes a pre-programmed movement sequence or exceeds an encoder limit, or if the robot encounters an obstacle that precludes further movement and sends a corresponding signal to the application with notification thereof, the application ends the measurement pass and stores the measurement data in memory as a measurement set, again in association with a unique identifier.

Upon completing the eddy current test procedure as discussed above, the operator, using the eddy current test system, will have collected data identifying the presence, possible presence, or absence of defects in the test material over a given area of the test material surface, e.g., including the weld made at 77. As discussed above, this data, for any given point within the given area, may identify the defect if and to the extent the eddy current test system has been calibrated with predetermined defect-identifying data and the acquired measurement data corresponds to the predetermined defects. At positions where the eddy current test system identifies a possible defect, but is unable to correlate the defect with a predetermined defect identity, as discussed above, the stored data indicates that a defect may be present but does not identify the defect itself. The position of these unidentified defects on the test material surface (as represented by the Cartesian coordinate system having an origin at the test starting point for the corresponding measurement data set), however, are stored in the eddy current test system memory, as discussed above, and can be retrieved and displayed as indicators at the display on screen 46. As discussed herein, the locations of such defects are displayed with predetermined indicators (respectively corresponding to conditions of no defect, possible defect, or known defect) with respect to a predetermined starting point in the Cartesian coordinate system for each measurement data set, where the operator has marked or otherwise noted the starting point for each measurement data set on the test material surface. This allows the operator to locate the position of each unknown defect on the test material surface. Having located the position on the test material surface, the operator then may identify the then-unknown, possible defect utilizing the XRF system, as described below.

Returning to the example of the weld analysis at FIG. 4, for instance, when the application at computer 42 (FIG. 2) receives the operator's stop instruction, or determines that the limit on the number of passes has been reached, or determines any of the other stop-related conditions as discussed above with regard to the two-dimensional encoder and robot embodiments, at 118, the application reviews the eddy current test assessment data stored at database 62 (FIG. 2) and determines, at 152, whether that data includes any identification of a defect. If not, the application ends the process, at 154, and no further work is needed on the weld. The application may drive the computer display to so notify the operator. If a defect or possible defect is present in the assessment data, the application, operating through the computer processor, drives computer display 46 (FIG. 2) to display a message to the operator indicating a defect is or may be present, and its location with respect to the data set's starting position (as defined by the Cartesian coordinate system position information, with respect to the presumed starting point, as described above), and recommending further analysis of that test surface position. In one or more examples, the map is displayed simultaneously with a list of locations in the Cartesian coordinate system at which each defect or possible defect is located with respect to the presumed test starting position. In other embodiments, the application drives the computer's display to present the defect map and associates operator-selectable positions on the map with defect data or other indicators that convey the measurement results at the respective locations. The map display is of a flat, two-dimensional Cartesian coordinate space, with the origin being the presumed start position for the measurement data set. The application provides additional data that identifies the coordinate distances from that starting point to each position in the Cartesian system at which an eddy-test-identified defect occurs. For instance, the operator, through the use of the computer's input/output system, e.g., a mouse, touch pad, or touch screen, can interact with the image and select an area in the image at which the eddy current test indicates a defect may be present. Upon the operator's selection of that part of the image, the application detects the coordinate location of the operator's selection within the Cartesian system and identifies the closest measurement stored in memory for this measurement data set, in terms of distance in the flat Cartesian system, at which a defect or possible defect is determined to have occurred, as discussed above. The application then drives the display to present to the operator the distance coordinates, relative to the Cartesian origin, which corresponds to the operator's selected start position, thereby allowing the operator to locate the test material position at which to conduct the XRF analysis.

In one or more embodiments as discussed herein, operation of the application ends at this point. If the application detects a defect at 152, and so notifies the operator through the computer display, the operator, at 156, visually inspects the weld area on the test surface, e.g., as directed by the instructions provided by the application on the computer display, and determines if the weld is sufficiently accessible to bring XRF spectrometer 48 (FIG. 3) operatively to bear to further assess the weld. If the defect area is not sufficiently accessible, the operator may assume a repair is needed and remove the defect without further analysis at 158, e.g., by removing the contaminant-containing material identified by the eddy current test using a hand tool or machine tool and, optionally, filling the resulting depression or hole with uncontaminated material.

If, at 156, the defect area is accessible to the XRF spectrometer, the operator may further analyze the defect area with the XRF spectrometer, at 160. If, at 162, the XRF spectrometer indicates that the defect area does not, in fact, have a defect, the process ends, at 154, and the operator makes no further modifications to the weld.

If the XRF examination confirms the defect at 162, then at 164, a determination is made whether mapping is required, e.g., because the user wishes to do so or because mapping is required by a product inspection protocol. If, at 164, mapping is required, the map data is updated at 166 by the operator's manual entry of text to add to or replace the original descriptor for the material surface at the position where the eddy current test identified the defect and at which the XRF test was made. For instance, the operator, through the use of the computer's input/output system, e.g., a mouse, touch pad, or touch screen, can interact with the image and select the same area in the image at which the defect is identified that prompted the XRF analysis. Upon the operator's selection of that part of the image, the application detects the coordinate location of the operator's selection within the Cartesian system and identifies the closest measurement stored in memory for this measurement data set, in terms of distance in the flat Cartesian system, at which a defect of any kind is determined to have or possibly have occurred, as discussed above. The application then drives the display to present to the operator the descriptor text associated with that defect (or possible defect) and an editing window through which the operator may interact using the computer's input/output system and application user interface, thereby allowing the operator to update the descriptor information as a result the XRF analysis and to cause the application to save the updated information in the measurement data set for the relevant measurement. The operator may then remove the defect at 158, as discussed above.

In a still further example, the system includes a robot that is capable of traversing the test material surface under its own power in two dimensions (e.g., within the two dimensional Cartesian coordinate system as discussed above) and in which the XRF spectrometer is mounted so that, when the robot is placed in its operative position in which the robot's wheels or other motive means engages the test material surface to move the robot thereon, the XRF housing is secured in the robot so that the XRF device directs its X-ray beam directly downward from the robot frame to the test material surface. The robot may include, for example, an electric drive system and control circuitry in operative communication with both the drive system and the XRF spectrometer and that responds to commands provided by the computer to move the robot over the test surface and to actuate and deactuate the XRF spectrometer. In response to such commands, and assuming the operator initially places the robot at the same test start position in the eddy current test over the same test material surface area as discussed above (see FIG. 5, at 200), the control circuitry drives the drive system to move the robot on the test surface in the direction and for the distance as defined by the commands. The application drives the computer display to present the operator a user interface tool through which the operator, using the computer's input/output system, enters such direction and distance commands. The user interface tool also allows the operator create instructions to actuate and deactuate the XRF spectrometer. In response to the operator's selection of such commands, the application drives the computer to communicate the commands to the robot control circuitry, e.g., via a Bluetooth or other wireless or wired communication path, which actuates or deactuates the XRF spectrometer in accordance with the commands. In operation, when the operator determines the location of a defect or possible defect with regard to the Cartesian coordinate system, as discussed above, the operator responsively inputs instructions to the application through the computer's input/output system regarding a desired movement of the robot on the test material to the defect or possible defect location. The robot moves in response to those instructions. When the operator has so instructed the robot to move the distances in the two-dimensional space, as presented by the display for the selected defect location, to reach the selected defect or possible defect, the operator visually confirms that the robot has reached the desired location. If not, the operator may input additional adjusting movement instructions. When the robot is in position so that the XRF spectrometer is directly above the defect or possible defect location, the operator inputs to the application an instruction to actuate the XRF device. The application causes the computer to communicate such instruction to the robot circuitry, which controls the XRF spectrometer to direct the X-ray beam to the test material surface and acquire measurement data, as discussed above. In one or more embodiments, the operator views the spectrometer's display, as in the manual operation discussed herein, and inputs the results of the measurement to computer 42 through the computer's input/output system and the application's user interface. In doing so, the operator, as discussed herein, selects the position of the measurement's location based on the computer's display of the eddy current measurement data and inputs an update to the textual description of that defect or potential defect, which the application then stores in the computer's memory. In one or more other embodiments, the robot's processor communicates with the XRF spectrometer's processor to receive the identifier of the material that the XRF spectrometer determined corresponds to the measured spectral data (or, e.g., the textual explanation of that constituent material that the spectrometer would ordinarily display in response to a measurement) and controls the robot's communication system to transmit that information to computer 42, along with corresponding encoder data associated with the measurement's location on the test material surface, as discussed below. Upon receiving the information, the application operating at the computer's processor, determines the closest (in the Cartesian space) defect or possible defect reflected in the eddy current measurement information and updates the description thereof with the text transmitted by the robot or with predetermined text stored in the computer's memory that corresponds to a material identifier received from the robot.

The robot also includes a two-dimensional encoder that actuates in response to the robot's movement, e.g., through engagement with the test material surface or through engagement with the robot's drive mechanism to thereby output signals to computer 42 and the application indicative of the robot's two-dimensional movements. The application again assumes a beginning of an acquisition of test data to occur at the origin of the two-dimensional Cartesian coordinate system, thereafter accumulating, storing, and displaying acquired measurement data in association with the two-dimensional encoder data as that data establishes distances within the two-dimensional Cartesian area away from the beginning origin point. As the operator moves the robot over the test material, the robot outputs the encoder data back to the computer, at which the application tracks the robot's movement within the Cartesian coordinate system and drives the computer display to display the robot's position in the Cartesian space. In one or more embodiments, the application may also display the measurement data of a previous eddy current analysis of the same test material area on the same Cartesian map at the display. The operator has selected (from the computer's memory via the application user interface) the measurement data prior to the XRF analysis for display and has placed the robot at the position on the test material surface at which the corresponding eddy current measurement started (e.g., at a position marked for that purpose by the operator, as discussed herein) and that corresponds to the Cartesian space origin for the resulting eddy current test data that the computer displays (see FIG. 5, 200). Because the operator can see both the robot's current position and the eddy current measurement positions in the Cartesian space presently on the display, the operator knows the robot's position on the test material surface relative to the previously identified eddy current measurement positions. Thus, the operator inputs movement instructions to the robot via the application user interface, as discussed above, to thereby move the robot toward one of the defects or possible defects that the eddy current analysis identified. As the application automatically updates the representation of the robot's position on the display in response to the received robot encoder data as the robot moves, the operator may adjust the movement instructions, if and as needed, so that the robot moves to the desired position on the test material surface. When the operator determines, through observation of the display, that the robot is over a position on the test material surface at which a defect or possible defect has been identified by the eddy current analysis, in that the display indicates that the robot's position in the Cartesian overlaps the desired one of the defects or possible defects from the eddy current analysis, the operator actuates the XRF spectrometer via the user interface to make a measurement. The computer transmits that instruction to the robot, which actuates the XRF spectrometer, which, in turn, acquires a measurement. As discussed above, the XRF spectrometer determines if a defect is present or not present and may determine the constituent materials of a defect, and the operator may view the XRF spectrometer's display of the measurement result and update the measurement data at computer 42 through interaction with the computer's input/output system and the application's user interface. In other embodiments, however, the robot's control system acquires the test measurement data from its communication with the XRF spectrometer and transmits the measurement data, in association with its current encoder data, to the computer. The application, upon receipt of such measurement and encoder data, determines from the encoder data the position in the Cartesian coordinate system at which the measurement was made, relative to the origin. The application examines the eddy current test data applicable to this test material and identifies the closest measurement stored in memory for this measurement data set, in terms of distance in the flat Cartesian system, at which a defect or possible defect is determined to have occurred, as discussed above, adds the measurement result data uploaded from the XRF spectrometer via the robot, and saves the new measurement information in the measurement data set at the selected position. As noted herein, in one or more embodiments, the uploaded data may be text that the application stores as it is received. In other embodiments, the uploaded data is an identifier of the constituent material, so that the application finds predetermined text from a lookup table stored at computer 42 that associates respective descriptive text in association with the possible identifiers the robot might upload and updates the measurement text with such descriptive text. The operator may then remove the defect at 158 or continue the robot on to another defect or possible defect position to repeat the process.

If, after removing the defect at 158, and again assuming the affected area of the test surface is accessible to XRF examination, at 170, the operator again examines the area with the XRF testing device, at 172, either manually or through use of the robot. If the area is not accessible, the operator may verify the defect's removal using a microprobe, at 174. As should be understood, in a microprobe examination, the operator utilizes a mechanical tool to scratch the area of the test material surface of interest, thereby acquiring a physical sample of the test material surface that may be assessed by electron analysis at a remote location. If, at 176, the defect is confirmed by XRF or manual examination to remain, the operator again attempts to remove the defect, at 158, as discussed above, and that part of the procedure is repeated.

If, at 176, the defect is determined to have been successfully removed, the operator examines the weld area at 178 to determine if, despite removal of the defect, the weld needs to be remade. If remaking the weld is not needed, the process ends, at 154. If the weld needs to be remade, the operator does so, at 180, and the newly formed weld is finished and examined, beginning at 74.

Many modifications and other embodiments of the inventions set forth herein will come to mind to one skilled in the art to which these inventions pertain having the benefit of the teachings presented in the foregoing descriptions and the associated drawings. Thus, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments but not necessary all example embodiments. Thus, any advantages, benefits, or solutions described herein should not be thought of as being critical, required, or essential to all embodiments or to that which is claimed herein. Although specific terms are employed herein, they may be used in a generic and descriptive sense only and not for purposes of limitation.

What is claimed is:

1. A method of inspecting a material, comprising the steps of: disposing an eddy current sensor proximate a material so that, when activated, the eddy current sensor outputs a measurement signal that varies with variations in electrical conductivity and magnetic permeability of the material; activating the eddy current sensor; acquiring the measurement signal from the activated eddy current sensor when the activated eddy current sensor is proximate a surface of the material at a location on the surface; comparing data corresponding to the measurement signal to a first predetermined criteria corresponding to presence of a first predetermined condition of the material; applying an X-ray signal to the material at the location; acquiring a fluorescence signal resulting from application of the X-ray signal at the location; comparing data corresponding to the fluorescence signal to a second predetermined criteria corresponding to presence of a second predetermined condition of the material; and in response to the comparing data corresponding to the measurement signal to a first predetermined criteria or the comparing data corresponding to the fluorescence signal to a second predetermined criteria, performing a repair on the material.

2. The method as in claim 1, further comprising the steps of
storing in electronic memory first data corresponding to comparison of the data corresponding to the measurement signal to the first predetermined criteria, and
storing in electronic memory second data corresponding to comparison of the data corresponding to the fluorescence signal to the second predetermined criteria.

3. The method as in claim 2, wherein the first storing step comprises storing the first data in association with data identifying the location, and wherein the second storing step comprises storing the second data in association with data identifying the location.

4. The method as in claim 1, comprising, following the step of comparing data corresponding to the measurement signal to the first predetermined criteria, the step of determining whether the first predetermined condition of the material is present.

5. The method as in claim 4, wherein the step of applying the X-ray signal to the material comprises applying the X-ray signal to the material at the location in response to a determination at the determining step that the second predetermined condition of the material is present.

6. The method as in claim 5, wherein each of the first predetermined condition of the material and the second predetermined condition of the material is the presence of a contaminant material.

7. The method as in claim 1, wherein the second predetermined condition of the material is the first predetermined condition of the material.

8. A method of inspecting a material, comprising the steps of: disposing an eddy current sensor proximate a material so that, when activated, the eddy current sensor outputs a measurement signal that varies with variations in electrical conductivity and magnetic permeability of the material;
moving the eddy current sensor over a surface of the material while the eddy current sensor is activated;
repeatedly acquiring the measurement signals from the activated eddy current sensor, wherein each acquired measurement signal is acquired when the activated eddy current sensor is proximate the surface of the material at a respective location of a plurality of locations on the surface;
for each measurement signal acquired at the acquiring step, comparing data corresponding to the acquired measurement signal to a respective first predetermined criteria corresponding to presence of a first predetermined condition of the material at the respective location at which the measurement signal was acquired;
applying an X-ray signal to the material at at least one said location of the plurality of locations;
acquiring a respective fluorescence signal resulting from application of the X-ray signal at the at least one said location;
comparing data corresponding to each respective fluorescence signal to a respective second predetermined criteria corresponding to presence of a second predetermined condition of the material; and in response to the comparing data corresponding to the acquired measurement signal to a respective first predetermined criteria or the comparing data corresponding to each respective fluorescence signal to a respective second predetermined criteria, performing a repair on the material.

9. The method as in claim 8, further comprising the steps of
storing in electronic memory first data corresponding to comparison of the data corresponding to the measurement signal acquired at the acquiring step for each location of the plurality of locations to the respective first predetermined criteria, and
storing in electronic memory second data corresponding to comparison of the data corresponding to each respective fluorescence signal to the second predetermined criteria.

10. The method as in claim 9, wherein the first storing step comprises, for each said location, storing the first data in association with data identifying the location to which the first data corresponds, and wherein the second storing step comprises storing the second data in association with data identifying the location to which the second data corresponds.

11. The method as in claim 10, comprising the step of displaying, at an electronic display, for each stored first data, an indicator identifying whether the first predetermined condition of the material is present at the location to which the first data corresponds.

12. The method as in claim 11, wherein the step of applying the X-ray signal to the material comprises applying the X-ray signal to the material at each said location at which the indicator identifies that the first predetermined condition of the material is present.

13. The method as in claim 8, comprising, for each said location, following the step of comparing data corresponding to the measurement signal acquired for said location to the first predetermined criteria, the step of determining whether the first predetermined condition of the material is present.

14. The method as in claim 13, wherein the step of applying the X-ray signal to the material comprises applying the X-ray signal to the material at each said location at which the determining step results in a determination that the second predetermined condition of the material is present.

15. The method as in claim 8, wherein each of the first predetermined condition of the material and the second predetermined condition of the material is the presence of a contaminant material.

16. A method of inspecting a material, comprising the steps of: disposing an eddy current sensor proximate a material so that, when activated, the eddy current sensor outputs a measurement signal that varies with variations in electrical conductivity and magnetic permeability of the material;
moving the eddy current sensor over a surface of the material while the eddy current sensor is activated;
acquiring the measurement signal from the activated eddy current sensor when the activated eddy current sensor is proximate the surface of the material at a location on the surface;
comparing data corresponding to the measurement signal to a first predetermined criteria corresponding to presence of a predetermined condition of the material;
in response to a comparison resulting from the comparing step, disposing an X-ray fluorescence spectrometer proximate the location so that activation of the X-ray fluorescence spectrometer causes the X-ray fluorescence spectrometer to apply an X-ray signal to the material at the location and acquire a fluorescence signal resulting from the application of the X-ray signal at the location; and in response to the comparing data corresponding to the measurement signal to a first predetermined criteria or the fluorescence signal resulting from the application of the X-ray signal at the location, performing a repair on the material.

17. The method as in claim 16, wherein, at the step of disposing the X-ray fluorescence spectrometer, the X-ray fluorescence spectrometer compares data corresponding to the fluorescence signal to a second predetermined criteria corresponding to a presence of the predetermined condition of the material.

* * * * *